US011650780B2

(12) United States Patent
Kim et al.

(10) Patent No.: US 11,650,780 B2
(45) Date of Patent: May 16, 2023

(54) DISPLAY APPARATUS FOR PROVIDING CONTENT IN CONNECTION WITH USER TERMINAL AND METHOD THEREFOR

(71) Applicant: LG ELECTRONICS INC., Seoul (KR)

(72) Inventors: Soojung Kim, Seoul (KR); Chiho Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/031,789

(22) Filed: Sep. 24, 2020

(65) Prior Publication Data

US 2021/0397401 A1 Dec. 23, 2021

(30) Foreign Application Priority Data

Jun. 22, 2020 (KR) .................. 10-2020-0075922

(51) Int. Cl.
*H04N 21/442* (2011.01)
*G06F 3/14* (2006.01)
*G06V 40/10* (2022.01)
*H04N 21/41* (2011.01)

(52) U.S. Cl.
CPC .......... *G06F 3/1454* (2013.01); *G06V 40/103* (2022.01); *H04N 21/4126* (2013.01); *H04N 21/44209* (2013.01); *H04N 21/44218* (2013.01)

(58) Field of Classification Search
None
See application file for complete search history.

(56) References Cited

U.S. PATENT DOCUMENTS

| 10,587,782 | B1* | 3/2020 | Barnes ..................... H04N 5/04 |
| 2007/0033607 | A1 | 2/2007 | Bryan | |
| 2011/0046755 | A1 | 2/2011 | Sung et al. | |
| 2014/0035814 | A1* | 2/2014 | de Lima ................ G06F 1/3265 345/158 |
| 2014/0067828 | A1* | 3/2014 | Archibong .......... G06F 16/4387 707/748 |
| 2017/0208364 | A1* | 7/2017 | Glazier ............ H04N 21/44227 |
| 2017/0347155 | A1* | 11/2017 | Cannistraro ....... H04N 21/4826 |
| 2019/0268460 | A1* | 8/2019 | Agrawal ........... H04M 1/72454 |

FOREIGN PATENT DOCUMENTS

EP 3104574 12/2016

OTHER PUBLICATIONS

European Patent Office Application Serial No. 20198963.9, Search Report dated Nov. 25, 2020, 7 pages.

* cited by examiner

*Primary Examiner* — Jefferey F Harold
*Assistant Examiner* — Charles N Hicks
(74) *Attorney, Agent, or Firm* — Lee, Hong, Degerman, Kang & Waimey PC

(57) ABSTRACT

An embodiment according to the present disclosure provides a display apparatus including a display, an audio output interface, a memory, a communication interface configured to connect to a terminal of a user, and a processor configured to output, via at least one of the display or the audio output interface, content stored in the memory or received through the communication interface, determine a position of the terminal to which the communication interface is connected, determine whether the position of the terminal is outside of a viewing area, and based on determining that the position of the terminal is outside of the viewing area, output the content to the terminal.

15 Claims, 23 Drawing Sheets

FIG. 7
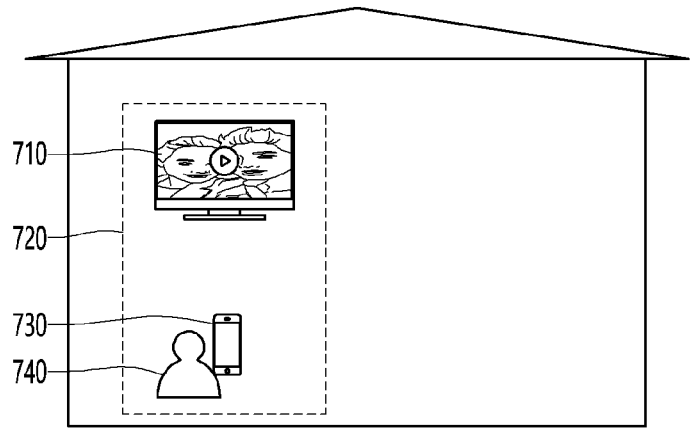
(a)
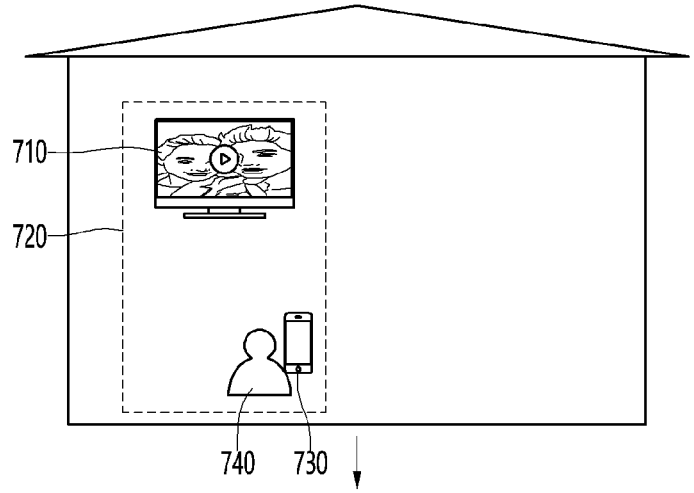
(b)
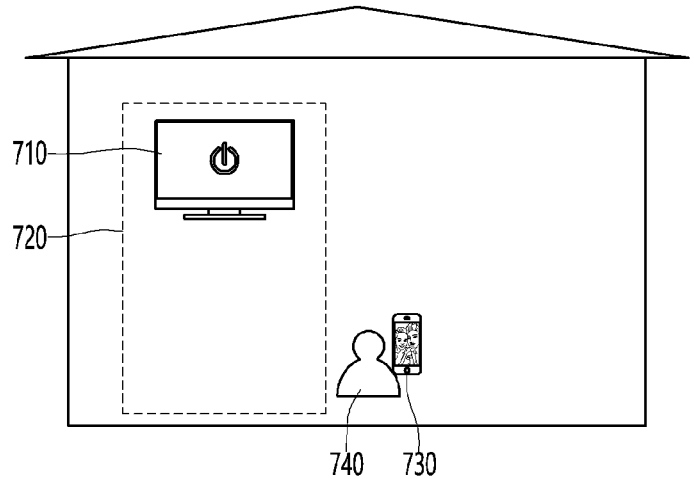
(c)

FIG. 8
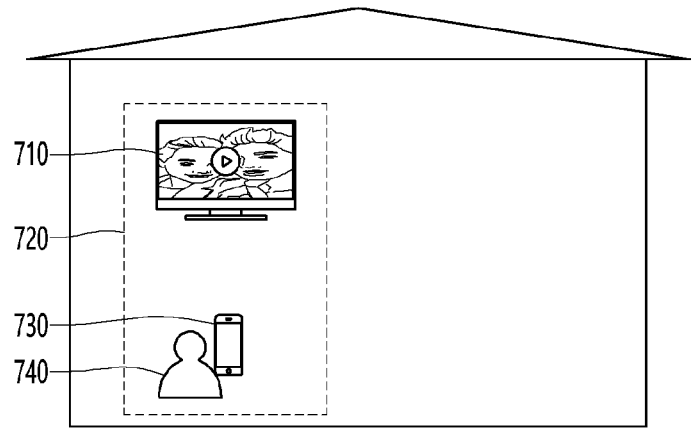
(a)
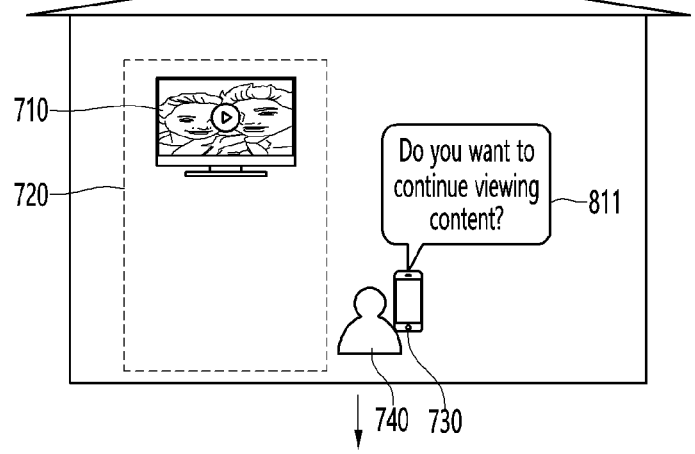
(b)
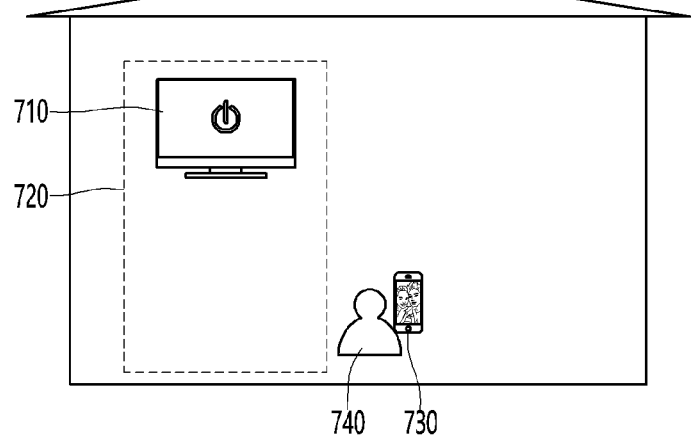
(c)

FIG. 9
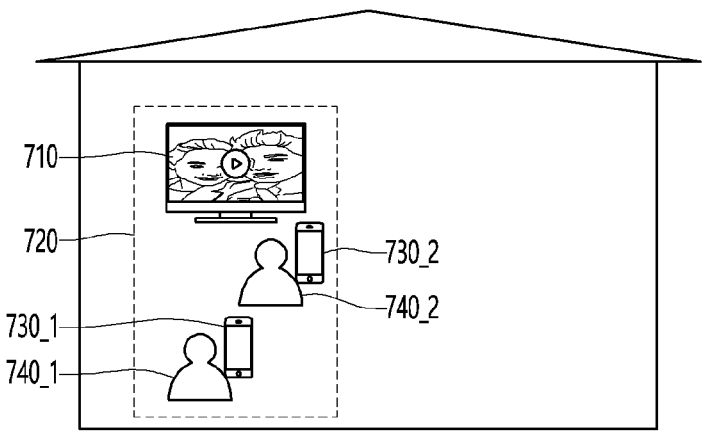
(a)
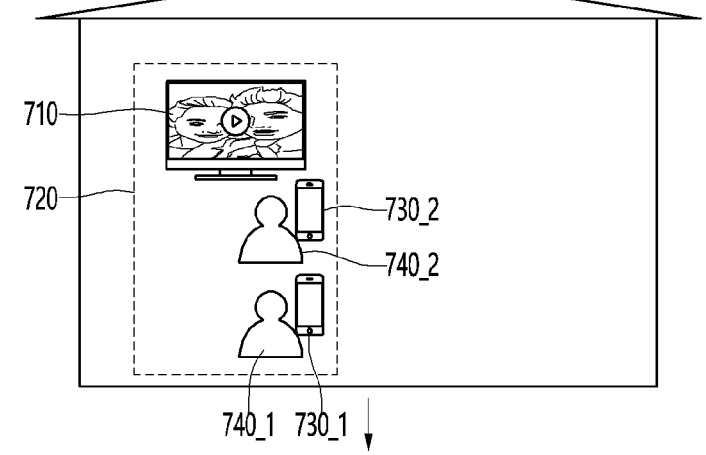
(b)
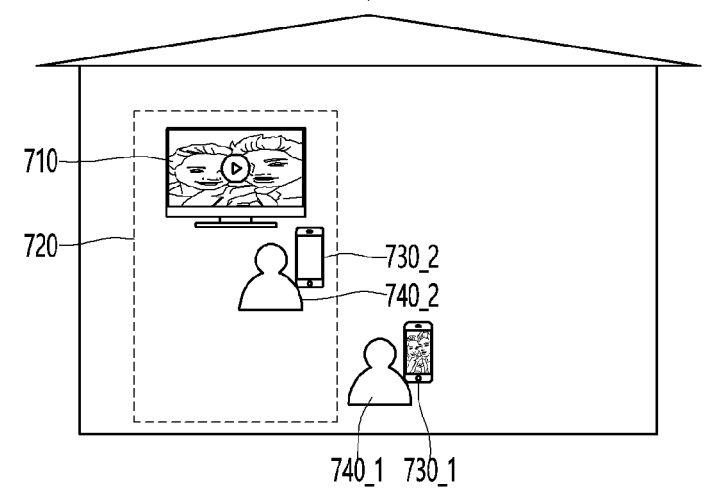
(c)

FIG. 12
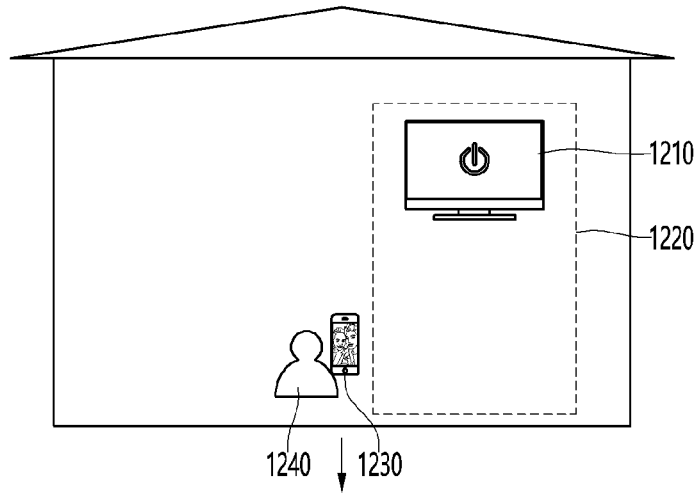
(a)
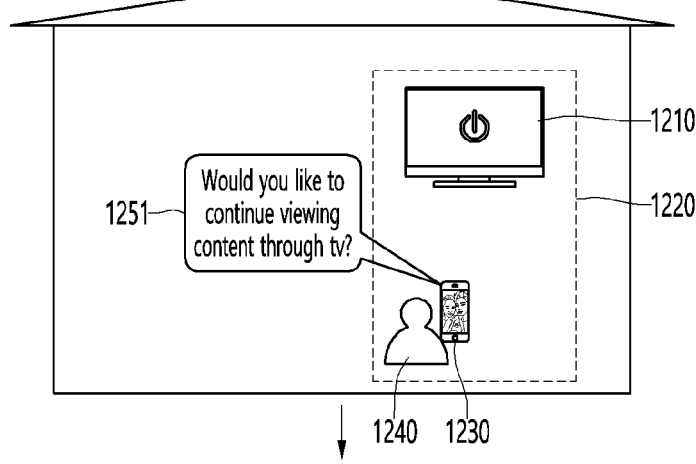
(b)
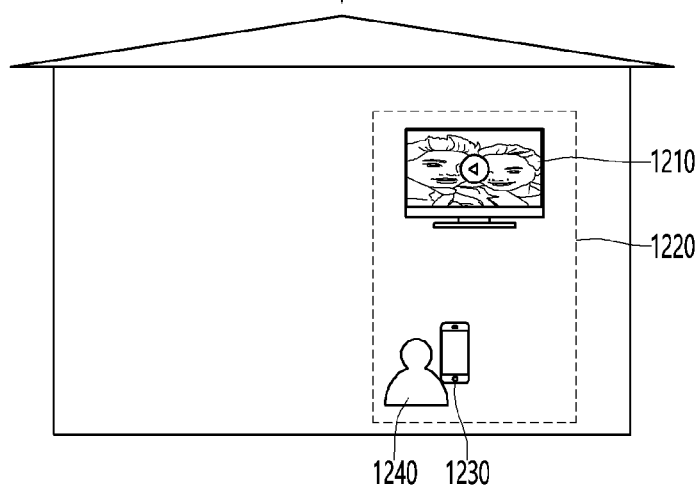
(c)

FIG. 14
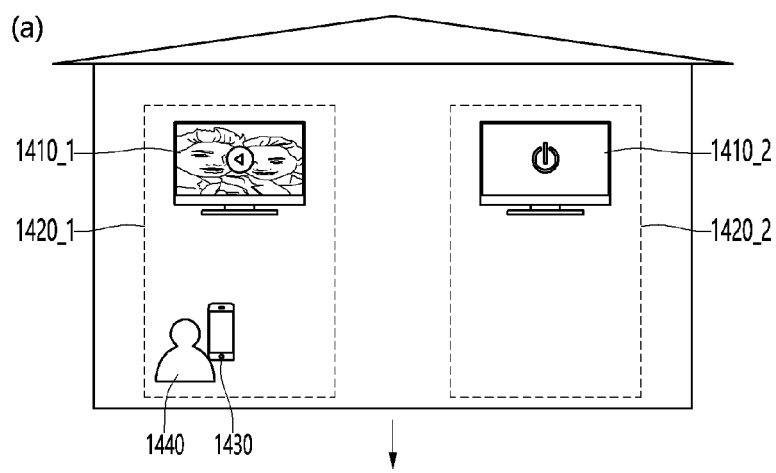
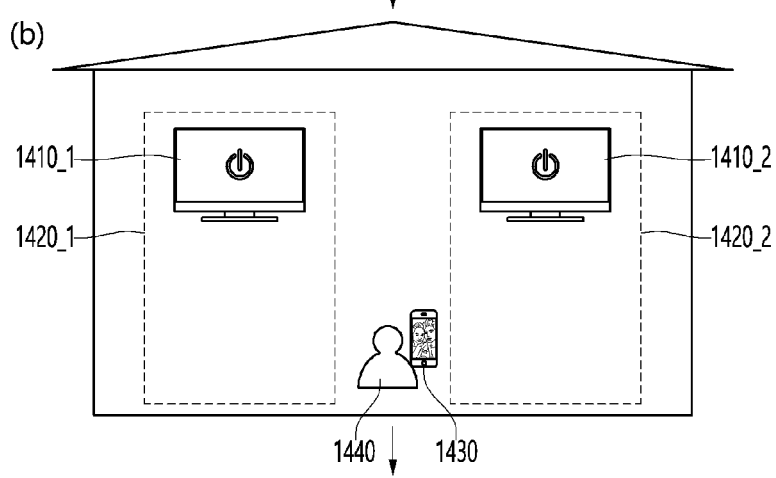
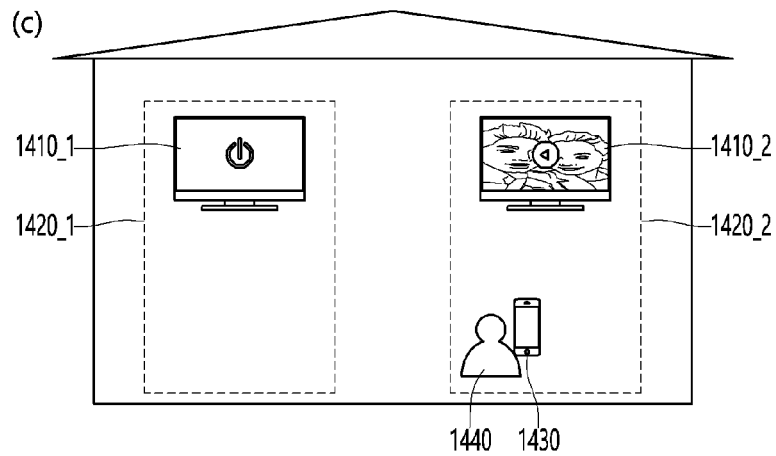

FIG. 15
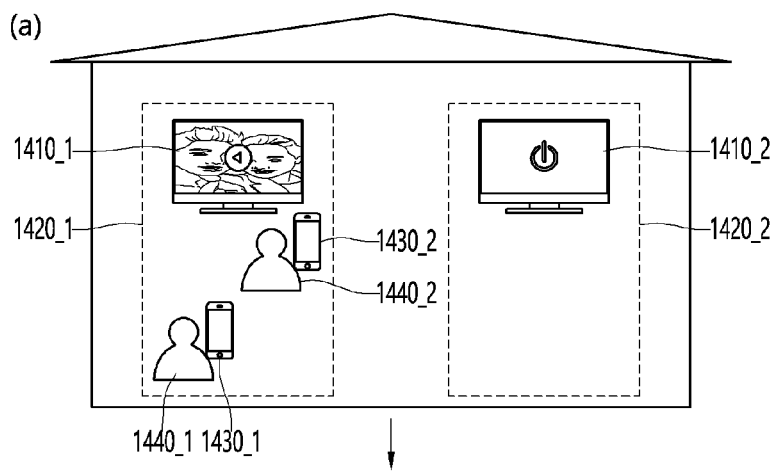
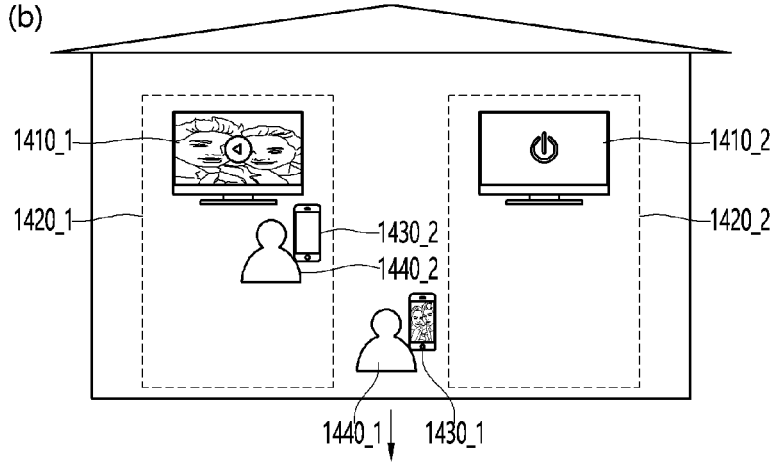
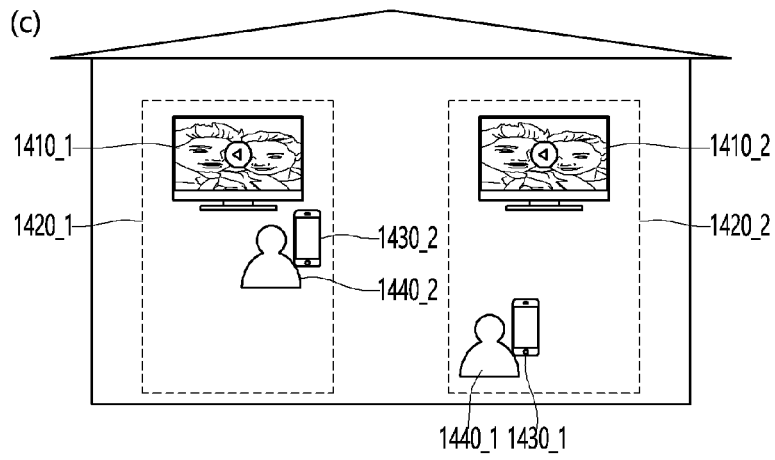

DISPLAY APPARATUS FOR PROVIDING CONTENT IN CONNECTION WITH USER TERMINAL AND METHOD THEREFOR

CROSS-REFERENCE TO RELATED APPLICATIONS

Pursuant to 35 U.S.C. § 119(a), this application claims the benefit of earlier filing date and right of priority to Korean Patent Application No. 10-2020-0075922, filed on Jun. 22, 2020, the contents of which are hereby incorporated by reference herein in its entirety.

BACKGROUND

The present disclosure relates to a display apparatus for providing content in connection with a user terminal a method therefor.

The display apparatus is an apparatus that provides visualized content using a display or display panel. However, conventionally, one display apparatus only provides content in an installed space alone or together with a plurality of display apparatus and cannot provide content to a user that is out of the installed space. Here, the fact that the plurality of display apparatus provide content may mean a case where the plurality of display apparatus are disposed to be physically adjacent to each other to form a larger screen than the screen of a single display apparatus.

If the user is in front of or near the display apparatus, the user can view the content provided from the display apparatus, but there is a problem that if the user is outside of the space where the display apparatus is installed, the user cannot view content provided by the display apparatus.

SUMMARY

An object of the present disclosure is to provide a display apparatus and a method for seamlessly providing content to a user in connection with a user's terminal even if the user has left a space where the display apparatus is installed and a method therefor.

An embodiment of the present disclosure provides a display apparatus which is connected to a user terminal, grasps a position of the connected terminal to determine whether a user is outside of a viewing area of the display apparatus, and outputs, if the user is outside of the viewing area of the display apparatus, content being output from the display apparatus through the user terminal, and a method therefor.

The content may be output through the terminal by transmitting content data corresponding to the content to be output, screen data when the content is output, or connection information corresponding to the content to the connected terminal.

Even if the connected terminal is outside of the viewing area, it is determined whether another viewer exists using the image data acquired through the camera, and if there is another viewer, even if the content is output through the terminal, the display apparatus may continue outputting the content.

It is determined whether the connected terminal is inside of the viewing area of the display apparatus, and if the connected terminal is inside of the viewing area, the content being output on the connected terminal may be output through the display apparatus.

The position of the connected terminal may be determined based on at least one of a received signal strength indication (RSSI) or a round trip time (RTT) of a communication signal.

In consideration of at least one of a distance between a connected terminal and a display apparatus, a positional relationship between the connected terminal and another device, a user setting viewing area, or map data, it may be determined whether the connected terminal is out of the viewing area of the display apparatus.

According to various embodiments of the present disclosure, even if the user is outside of the space where the display apparatus is installed, the user can view the content through another device.

In addition, according to various embodiments of the present disclosure, a user's position may be determined based on the user terminal to grasp a positional relationship with the user without additional equipment.

In addition, according to various embodiments of the present disclosure, the content may be provided to all users even if some of the plurality of users are outside of an area where the display apparatus is installed.

In addition, according to various embodiments of the present disclosure, by using standard technology, it is possible to output seamless content regardless of the operating system type of the user terminal.

BRIEF DESCRIPTION OF THE DRAWINGS

FIG. 7 is a view illustrating an embodiment in which a display apparatus provides content in connection with a user terminal.

FIG. 8 is a view illustrating an embodiment in which a display apparatus provides content in connection with a user terminal.

FIG. 9 is a view illustrating an embodiment in which a display apparatus provides content in connection with a user terminal.

FIG. 12 is a view illustrating an embodiment in which a display apparatus provides content in connection with a user terminal.

FIG. 14 is a view illustrating an embodiment in which a plurality of display apparatus provide content in connection with a user terminal.

FIG. 15 is a view illustrating an embodiment in which a plurality of display apparatus provide content in connection with a user terminal.

DETAILED DESCRIPTION OF THE EMBODIMENTS

Figure 1:
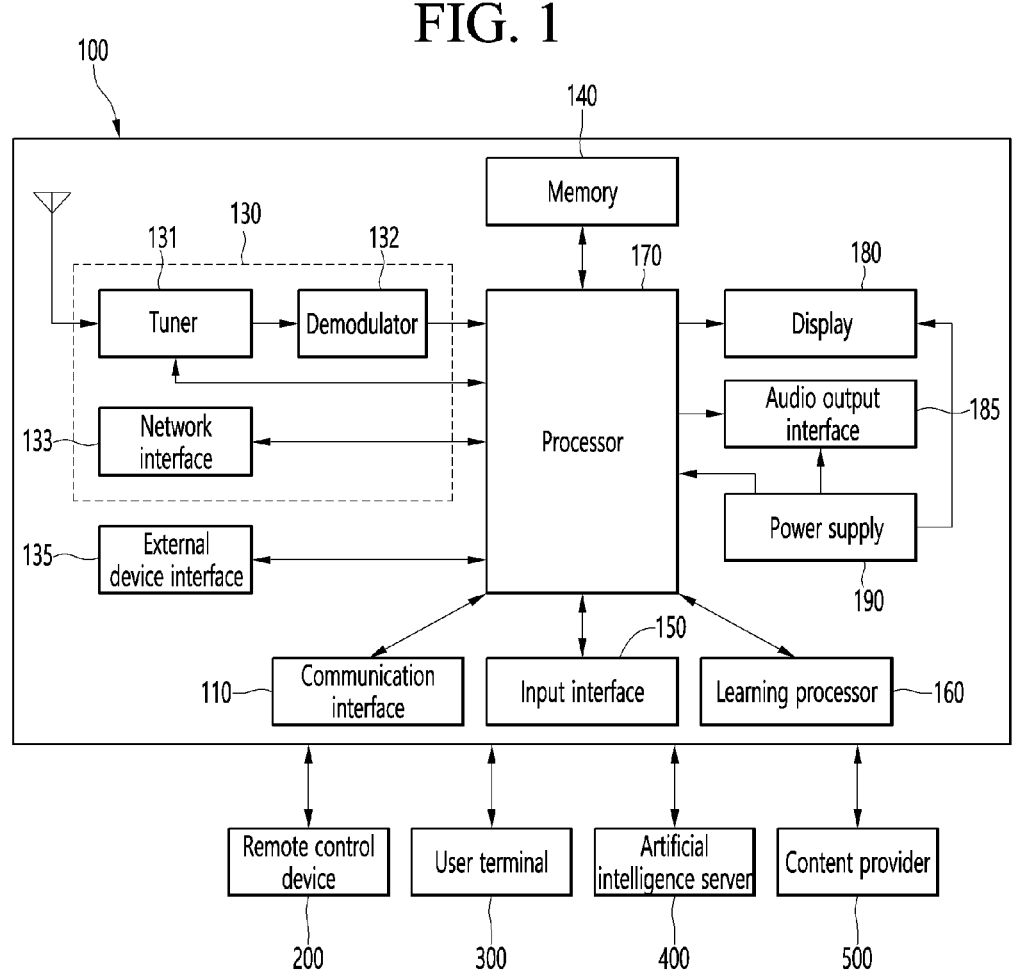
FIG. 1 is a block diagram illustrating a display apparatus according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes 'module' and 'unit' for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms 'first' and 'second' are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

FIG. 1 is a block diagram illustrating a display apparatus 100 according to an embodiment of the present disclosure.

Referring to FIG. 1, the display apparatus 100 is connected to at least one of a remote control device 200, a user terminal 300, an artificial intelligence server 400, or a content provider 500 to be capable of transmitting and receiving data or signals.

The display apparatus 100 may mean an apparatus capable of displaying image including display 180 (or diplay panel), and may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

The user terminal 300 may be implemented as a mobile phone, a smart phone, a tablet PC, a laptop, a wearable device, a PDA, or the like. The user terminal 300 may be simply referred to as a terminal 300.

The content provider 500 refers to a device that provides content data corresponding to content to be output from the display apparatus 100, and the display apparatus 100 may receive content data from the content provider 500 to output content.

The display apparatus 100 may include a communication interface 110, a broadcast receiver 130, an external device interface 135, a memory 140, an input interface 150, a processor 170, a display 180, an audio output interface 185, and a power supply 190.

The communication interface 110 may communicate with external devices through wired or wireless communication. For example, the communication interface 110 may transmit and receive sensor information, a user input, a learning model, a control signal, and the like with external devices such as other display apparatus. Here, the other display apparatus 100 may be a mobile terminal such as a wearable device (for example, a smart view, smart glasses, a head mounted display (HMD)) and a smart phone capable of exchanging data (or interlocking) with the display apparatus 100 according to the present disclosure.

The communication interface 110 may detect (or recognize) a communicable wearable device around the display apparatus 100. Furthermore, if the detected wearable device is a device authenticated to communicate with the display apparatus 100, the processor 170 may transmit at least a part of data processed at the display apparatus 100 to the wearable device through the communication interface 110. Therefore, a user of the wearable device can use data processed at the display apparatus 100 through the wearable device.

The communication technology used by the communication interface 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The communication interface 110 may be referred to as a communication modem.

The broadcast receiver 130 may include a tuner 131, a demodulator 132, and a network interface 133.

The tuner 131 may select a specific broadcast channel according to a channel selection command. The tuner 131 may receive broadcast signals for the selected specific broadcast channel.

The demodulator 132 may divide the received broadcast signals into video signals, audio signals, and broadcast program related data signals and restore the divided video signals, audio signals, and data signals to an output available form.

The external device interface 135 may receive an application or an application list in an adjacent external device and deliver it to the processor 170 or the memory 140.

The external device interface 135 may provide a connection path between the display apparatus 100 and an external device. The external device interface 135 may receive at least one an image or audio output from an external device that is wirelessly or wiredly connected to the display apparatus 100 and deliver it to the processor 170. The external device interface 135 may include a plurality of external input terminals. The plurality of external input terminals may include an RGB terminal, at least one High Definition Multimedia Interface (HDMI) terminal, and a component terminal.

An image signal of an external device input through the external device interface 135 may be output through the display 180. A voice signal of an external device input through the external device interface 135 may be output through the audio output interface 185.

An external device connectable to the external device interface 135 may be one of a set-top box, a Blu-ray player, a DVD player, a game console, a sound bar, a smartphone, a PC, a USB Memory, and a home theater system, but this is just exemplary.

The network interface 133 may provide an interface for connecting the display apparatus 100 to a wired/wireless network including the Internet network. The network interface 133 may transmit or receive data to or from another user or another electronic device through an accessed network or another network linked to the accessed network.

Some content data stored in the display apparatus 100 may be transmitted to a user or an electronic device, which is selected from other users or other electronic devices pre-registered in the display apparatus 100.

The network interface 133 may access a predetermined webpage through an accessed network or another network linked to the accessed network. In other words, the network interface 133 may transmit or receive data to or from a corresponding server by accessing a predetermined webpage through the network.

The network interface 133 may receive contents or data provided from a content provider or a network operator. In other words, the network interface 133 may receive contents such as movies, advertisements, games, VODs, and broadcast signals, which are provided from a content provider or a network provider, through network and information relating thereto.

The network interface 133 may receive firmware update information and update files provided from a network operator and transmit data to an Internet or content provider or a network operator.

The network interface 133 may select and receive a desired application among applications open to the public, through network.

The memory 140 may store signal-processed image, voice, or data signals stored by a program in order for each signal processing and control in the processor 170. For example, the memory 140 may store an input data acquired by an input interface 150, training data, learning model, training history and the like.

The memory 140 may perform a function for temporarily storing image, voice, or data signals output from the external device interface 135 or the network interface 133 and may store information on a predetermined image through a channel memory function.

The memory 140 may store an application or an application list input from the external device interface 135 or the network interface 133.

The display apparatus 100 may play content files (for example, video files, still image files, music files, document files, application files, and so on) stored in the memory 140 and provide them to a user.

The input interface 150 may acquire various kinds of data. The input interface 150 may include a camera for inputting a video signal, a microphone for receiving an audio signal, and a user input interface for receiving information from a user.

The user interface may deliver signals input by a user to the processor 170 or deliver signals from the processor 170 to a user. For example, the user interface may receive or process control signals such as power on/off, channel selection, and screen setting from the remote control device 200 or transmit control signals from the processor 170 to the remote control device 200 according to various communication methods such as Bluetooth, Ultra Wideband (WB), ZigBee, Radio Frequency (RF), and IR.

The user interface may deliver, to the processor 170, control signals input from local keys (not illustrated) such as a power key, a channel key, a volume key, and a setting key.

The learning processor 160 may train a model composed of an artificial neural network by using training data. The trained artificial neural network may be referred to as a learning model. The learning model may be used to an infer result value for new input data rather than training data, and the inferred value may be used as a basis for determination to perform a certain operation.

The learning processor 160 may perform AI processing together with the learning processor 440 of the AI server 400.

The learning processor 160 may include a memory integrated or implemented in the display apparatus 100. Alternatively, the learning processor 160 may be implemented by using the memory 170, an external memory directly connected to the display apparatus 100, or a memory held in an external device.

Image signals that are image-processed in the processor 170 may be input to the display 180 and displayed as an image corresponding to corresponding image signals. Additionally, image signals that are image-processed in the processor 170 may be input to an external output device through the external device interface 135.

Voice signals processed in the processor 170 may be output to the audio output interface 185. Additionally, voice signals processed in the processor 170 may be input to an external output device through the external device interface 135.

The processor 170 may control overall operations in the display apparatus 100.

The processor 170 may control the display apparatus 100 by a user command or internal program input through the user interface and download a desired application or application list into the display apparatus 100 in access to network.

The processor 170 may output channel information selected by a user together with processed image or voice signals through the display 180 or the audio output interface 185.

According to an external device image playback command received through the user interface, the processor 170 may output image signals or voice signals of an external device such as a camera or a camcorder, which are input through the external device interface 135, through the display 180 or the audio output interface 185.

The processor 170 may control the display 180 to display images. For example, the processor 170 may control the display 180 to display broadcast images input through the tuner 131, external input images input through the external device interface 135, images input through the network interface 133, or images stored in the memory 140. In this case, an image displayed on the display 180 may be a still image or video and also may be a 2D image or a 3D image.

The processor 170 may play content stored in the display apparatus 100, received broadcast content, and external input content input from the outside, and the content may be in various formats such as broadcast images, external input images, audio files, still images, accessed web screens, and document files.

The processor 170 may determine at least one executable operation of the display apparatus 100 based on information determined or generated by using a data analysis algorithm or a machine learning algorithm. Then, the processor 170 may control the components of the display apparatus 100 to execute the determined operation.

To this end, the processor 170 may request, search, receive, or utilize data of the learning processor 160 or the memory 140. The processor 170 may control the components of the display apparatus 100 to execute the predicted operation or the operation determined to be desirable among the at least one executable operation.

The processor 170 may acquire intention information for the user input and may determine the user's requirements based on the acquired intention information.

The processor 170 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 160, may be learned by the learning processor 440 of the AI server 400, or may be learned by their distributed processing.

The processor 170 may collect history information including the operation contents of the display apparatus 100 or the user's feedback on the operation and may store the collected history information in the memory 150 or the learning processor 160 or transmit the collected history information to the external device such as the AI server 400. The collected history information may be used to update the learning model.

The display 180 may convert image signals, data signals, or on-screen display (OSD) signals, which are processed in the processor 170, or images signals or data signals, which are received in the external device interface 135, into R, G, and B signals to generate driving signals.

Meanwhile, the display apparatus 100 illustrated in FIG. 1 is just one embodiment of the present disclosure and thus, some of the components illustrated may be integrated, added, or omitted according to the specification of the actually implemented display apparatus 100.

In one embodiment, two or more components may be integrated into one component or one component may be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display apparatus 100 may receive images through the network interface 133 or the external device interface 135 and play them without including the tuner 131 and the demodulator 132. For example, the display apparatus 100 may be divided into an image processing device such as a set-top box for receiving broadcast signals or contents according to various network services and a content playback device for playing contents input from the image processing device. In this case, an operating method of a display apparatus according to an embodiment of the present disclosure described below may be performed by one of the display apparatus described with reference to FIG. 1, an image processing device such as the separated set-top box, and a content playback device including the display 180 and the audio output interface 185.

Figure 2:
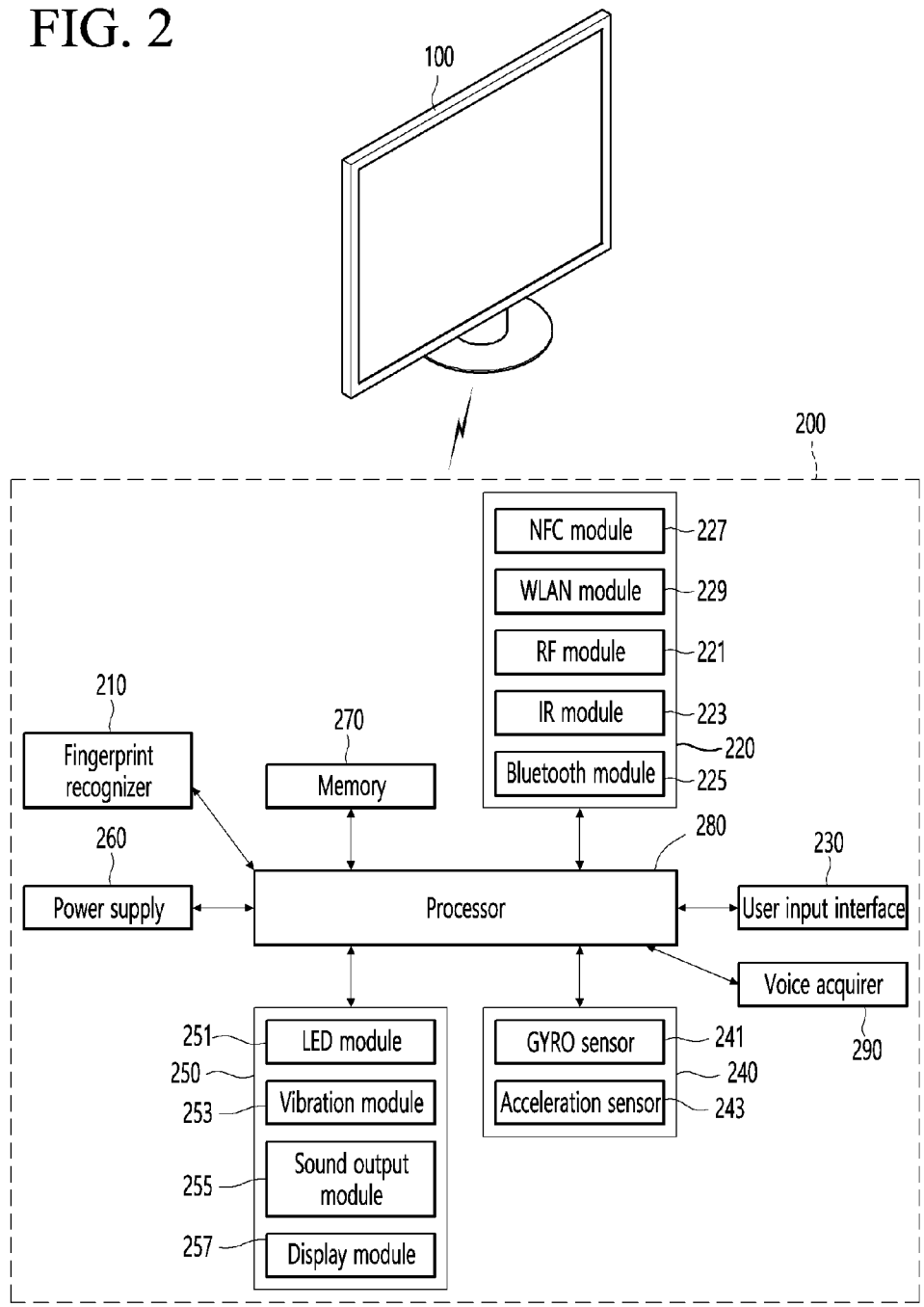
FIG. 2 is a block diagram illustrating a remote control device according to an embodiment of the present disclosure.

FIG. 2 is a block diagram illustrating a remote control device 200 according to an embodiment of the present disclosure.

Referring to FIG. 2, a remote control device 200 may include a fingerprint recognizer 210, a communication interface 220, a user input interface 230, a sensor 240, an output interface 250, a power supply 260, a memory 270, a processor 280, and a voice acquirer 290.

The communication interface 220 may transmit/receive signals to/from an arbitrary any one of display apparatuses 100 according to the above-mentioned embodiments of the present disclosure.

The remote control device 200 may include a radio frequency (RF) module 221 for transmitting/receiving signals to/from the display apparatus 100 according to the RF communication standards and an IR module 223 for transmitting/receiving signals to/from the display apparatus 100 according to the IR communication standards. Additionally, the remote control device 200 may include a Bluetooth module 225 for transmitting/receiving signals to/from the display apparatus 100 according to the Bluetooth communication standards. Additionally, the remote control device 200 may include a Near Field Communication (NFC) module 227 for transmitting/receiving signals to/from the display apparatus 100 according to the NFC communication standards and a WLAN module 229 for transmitting/receiving signals to/from the display apparatus 100 according to the Wireless LAN (WLAN) communication standards.

The remote control device 200 may transmit signals containing information on a movement of the remote control device 200 to the display apparatus 100 through the communication interface 220.

The remote control device 200 may receive signals transmitted from the display apparatus 100 through the RF module 221 and if necessary, may transmit a command on power on/off, channel change, and volume change to the display apparatus 100 through the IR module 223.

The user input interface 230 may be configured with a keypad button, a touch pad, or a touch screen. A user may operate the user input interface 230 to input a command relating to the display apparatus 100 to the remote control device 200. If the user input interface 230 includes a hard key button, a user may input a command relating to the display apparatus 100 to the remote control device 200 through the push operation of the hard key button.

If the user input interface 230 includes a touch screen, a user may touch a soft key of the touch screen to input a command relating to the display apparatus 100 to the remote control device 200. Additionally, the user input interface 230 may include various kinds of input means operated by a user, for example, a scroll key and a jog key.

The sensor 240 may include a gyro sensor 241 or an acceleration sensor 243, and the gyro sensor 241 may sense information on a movement of the remote control device 200. For example, the gyro sensor 241 may sense information on an operation of the remote control device 200 on the basis of x, y, and z axes and the acceleration sensor 243 may sense information on a movement speed of the remote control device 200. Moreover, the remote control device 200 may further include a distance measurement sensor and sense a distance with respect to the display 180 of the display apparatus 100.

The output interface 250 may output image or voice signals corresponding to operation of the user input interface 230 or corresponding to signals transmitted from the display apparatus 100. A user may recognize whether the user input interface 230 is operated or the display apparatus 100 is controlled through the output interface 250. For example, the output interface 250 may include an LED module 251 for flashing, a vibration module 253 for generating vibration, a sound output module 255 for outputting sound, or a display module 257 for outputting an image, if the user input interface 230 is operated or signals are transmitted/received to/from the display apparatus 100 through the communication interface 225.

The power supply 260 may supply power to the remote control device 200. The power supply 260 may stop the power supply if the remote control device 200 does not move for a predetermined time so that power waste may be reduced. The power supply 260 may resume the power supply if a predetermined key provided at the remote control device 200 is operated.

The memory 270 may store various kinds of programs and application data necessary for control or operation of the remote control device 200.

If the remote control device 200 transmits/receives signals wirelessly to/from the display apparatus 100 through the RF module 221, the remote control device 200 and the display apparatus 100 transmits/receives signals through a predetermined frequency band. To this end, the processor 280 of the remote control device 200 may store, in the memory 270, information on a frequency band for transmitting/receiving signals to/from the display apparatus 100 paired with the remote control device 200 and refer to it.

The processor 280 may control general matters relating to control of the remote control device 200. The processor 280 may transmit a signal corresponding to a predetermined key operation of the user input interface 230 or a signal corresponding to movement of the remote control device 200 sensed by the sensor 240 to the display apparatus 100 through the communication interface 225.

The voice acquirer 290 of the remote control device 200 may obtain voice. The voice acquirer 290 may include at least one microphone 291 and obtain voice through the microphone 291.

Figure 3:
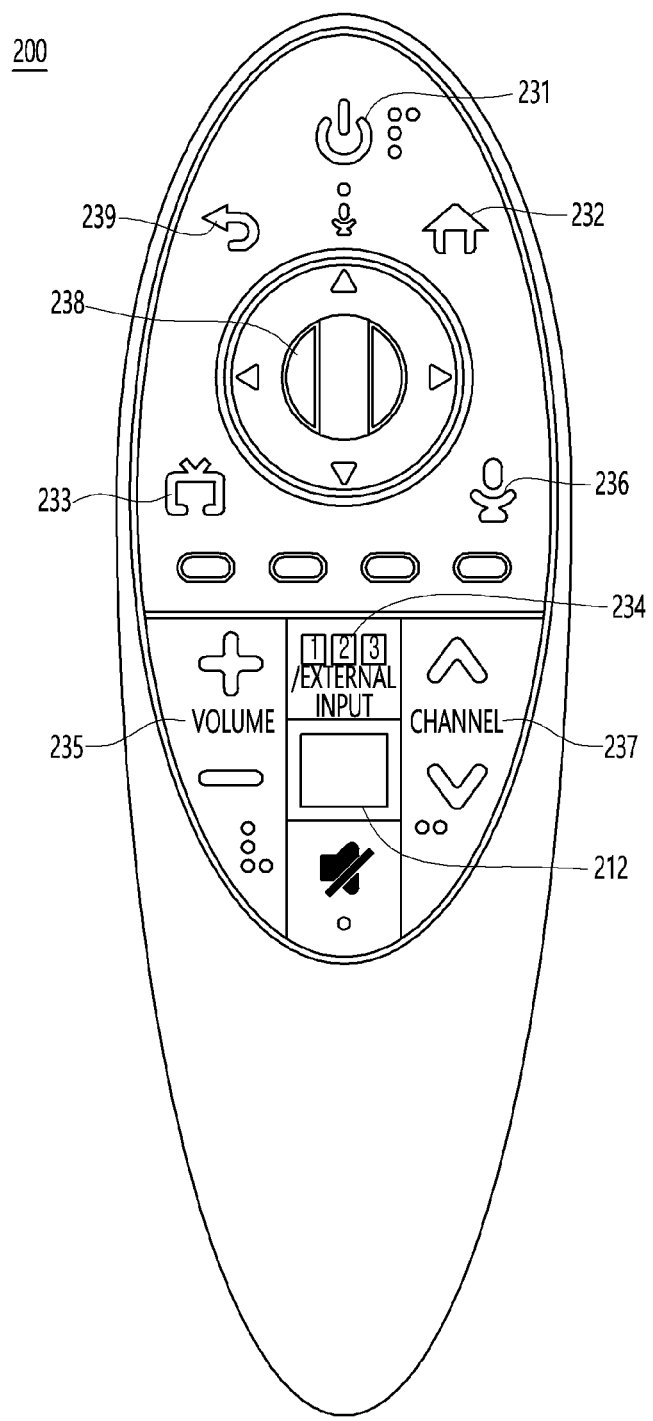
FIG. 3 is a view illustrating a remote control device according to an embodiment of the present disclosure.

FIG. 3 is a view illustrating a remote control device 200 according to an embodiment of the present disclosure.

Referring to FIG. 3, the remote control device 200 may include a plurality of buttons. The plurality of buttons may include a fingerprint recognition button 212, a power button 231, a home button 232, a live button 233, an external input button 234, a volume adjustment button 235, a voice recognition button 236, a channel change button 237, a check button 238, and a back button 239.

The fingerprint recognition button 212 may be a button for recognizing a user's fingerprint. According to an embodiment of the present disclosure, the fingerprint recognition button 212 may perform a push operation and receive a push operation and a fingerprint recognition operation. The power button 231 may be button for turning on/off the power of the display apparatus 100. The home button 232 may be a button for moving to the home screen of the display apparatus 100. The live button 233 may be a button for displaying live broadcast programs. The external input button 234 may be a button for receiving an external input connected to the display apparatus 100. The volume adjustment button 235 may be a button for adjusting the volume of a sound output from the display apparatus 100. The voice recognition button 236 may be a button for receiving user's voice and recognizing the received voice. The channel change button 237 may be a button for receiving broadcast signals of a specific broadcast channel. The check button 238 may be a button for selecting a specific function and the back button 239 may be a button for returning to a previous screen.

Figure 4:
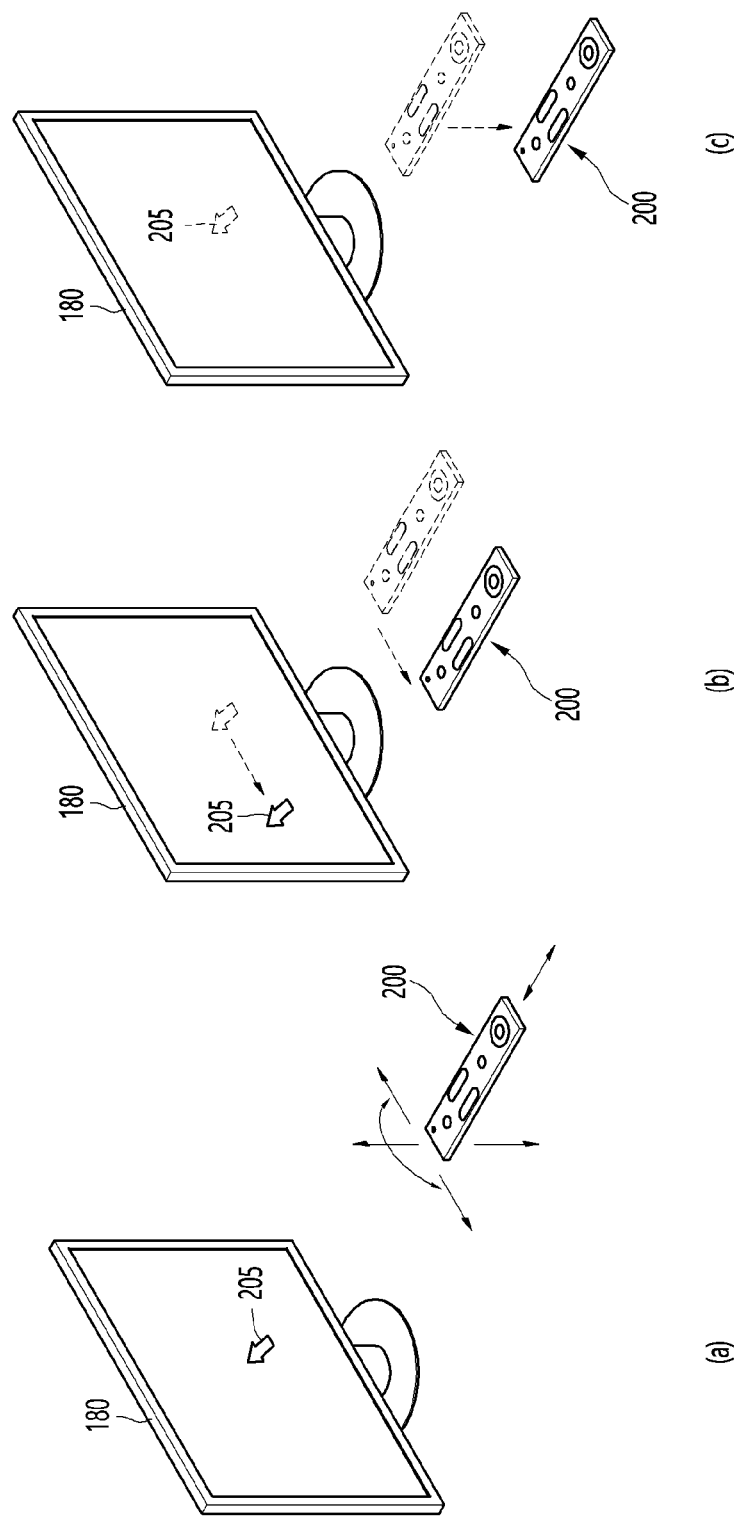
FIG. 4 is a view illustrating an example of interacting with the display apparatus through a remote control device in one embodiment of the present disclosure.

FIG. 4 is a view illustrating an example of interacting with the display apparatus 100 through a remote control device 200 in one embodiment of the present disclosure.

Referring to FIG. 4, a pointer 205 corresponding to the remote control device 200 may be displayed on the display 180.

Referring to FIG. 4(a), a user may move or rotate the remote control device 200 vertically or horizontally.

The pointer 205 displayed on the display 180 of the display apparatus 100 may move according to a movement of the remote control device 200. Since the corresponding pointer 205 is moved and displayed according to a movement on a 3D space, the remote control device 200 may be referred to as a spatial remote control device.

Referring to FIG. 4(b), if a user moves the remote control device 200, the pointer 205 displayed on the display 180 of the display apparatus 100 may be moved to the left according to the movement of the remote control device 200.

Information on a movement of the remote control device 200 detected through a sensor of the remote control device 200 may be transmitted to the display apparatus 100. The display apparatus 100 may calculate the coordinates of the pointer 205 from the information on the movement of the remote control device 200, and display the pointer 205 to match the calculated coordinates.

Referring to FIG. 4(c), when a user moves the remote control device 200 away from the display 180 while pressing a specific button in the remote control device 200, a selection area in the display 180 corresponding to the pointer 205 may be zoomed in and displayed larger. On the contrary, when the user moves the remote control device 200 to approach the display 180 while pressing a specific button in the remote control device 200, the selection area in the display 180 corresponding to the pointer 205 may be zoomed out and displayed smaller.

On the other hand, if the remote control device 200 is moved away from the display 180, a selection area may be zoomed out and if the remote control device 200 is moved closer to the display 180, a selection area may be zoomed in.

Additionally, if a specific button in the remote control device 200 is pressed, recognition of a vertical or horizontal movement may be excluded. In other words, if the remote control device 200 is moved away from or closer to the display 180, the up, down, left, or right movement may not be recognized and only the back and forth movement may be recognized. While a specific button in the remote control device 200 is not pressed, only the pointer 205 is moved according to the up, down, left or right movement of the remote control device 200.

The moving speed or moving direction of the pointer 205 may correspond to the moving speed or moving direction of the remote control device 200.

The pointer 205 in this disclosure may mean an object displayed on the display 180 in response to an operation of the remote control device 200. Accordingly, besides an arrow form displayed as the pointer 205 in the FIG. 4, various forms of objects are possible. For example, the pointer 205 may include a point, a cursor, a prompt, and a thick outline. Then, the pointer 205 may be displayed in correspondence to one point of a horizontal axis and a vertical axis on the display 180 and also may be displayed in correspondence to a plurality of points such as a line and a surface.

Figure 5:
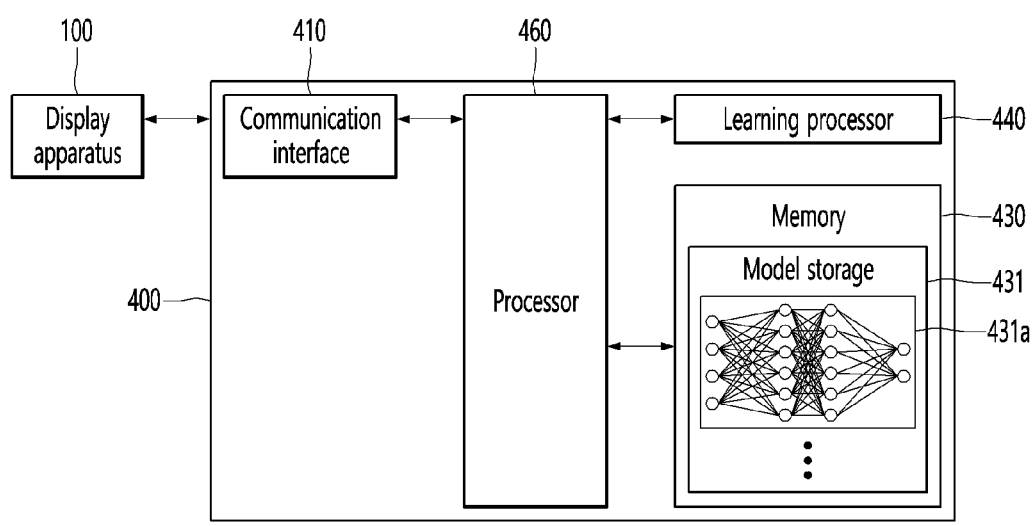
FIG. 5 is a block diagram illustrating an artificial intelligence server according to an embodiment of the present disclosure.

FIG. 5 is a block diagram illustrating an AI server 400 according to an embodiment of the present disclosure.

Referring to FIG. 5, the AI server 400 may refer to a device that learns an artificial neural network by using a machine learning algorithm or uses a learned artificial neural network. The AI server 400 may include a plurality of servers to perform distributed processing, or may be defined as a 5G network.

The AI server 400 may perform at least part of the AI processing of the display apparatus 100 together. The AI processing may mean a process required to train an AI model.

The AI server 400 may include a communication interface 410, a memory 430, a learning processor 440, a processor 460, and the like.

The communication interface 410 may transmit and receive data to and from an external device such as the display apparatus 100.

The memory 430 may include a model storage 431. The model storage 431 may store a learning or learned model (or an artificial neural network 431a) through the learning processor 440.

The learning processor 440 may learn the artificial neural network 431a by using the training data. The learning model may be used in a state of being mounted on the AI server 400 of the artificial neural network, or may be used in a state of being mounted on an external device such as the display apparatus 100.

The learning model may be implemented in hardware, software, or a combination of hardware and software. If all or part of the learning models are implemented in software, one or more instructions that constitute the learning model may be stored in memory 430.

The processor 460 may infer the result value for new input data by using the learning model and may generate a response or a control command based on the inferred result value.

Figure 6:
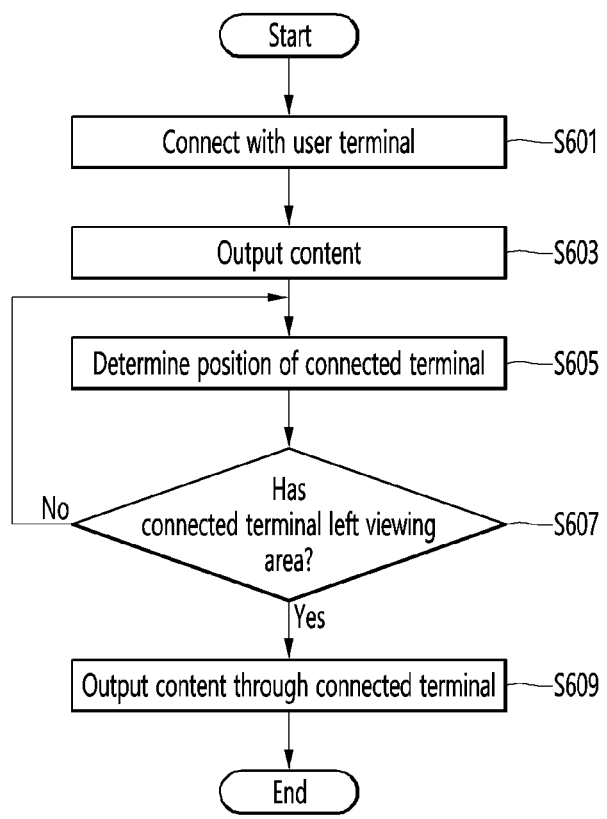
FIG. 6 is an operation flowchart illustrating a method of providing content in connection with a user terminal according to an embodiment of the present disclosure.

FIG. 6 is an operation flowchart illustrating a method of providing content in connection with a user terminal according to an embodiment of the present disclosure.

Referring to FIG. 6, the processor 170 of the display apparatus 100 connects with the user's terminal 300 through the communication interface 110 (S601).

The user's terminal 300 may mean the user terminal 300 carried by the user.

The communication interface 110 may connect with the terminal 300 using wired/wireless communication technology, and such connection may mean pairing. The communication interface 110 of the display apparatus 100 may connect with the terminal 300 directly or through an intermediate device based on various communication technologies such as Bluetooth, Wi-Fi, cellular network, infrared communication. In one embodiment, the display apparatus 100 is preferably connected with the terminal 300 using a neighbor awareness network (NAN) or Wi-Fi aware technology.

In one embodiment, the display apparatus 100 publishes connection information for a NAN connection through the communication interface 110, and the terminal 300 subscribes to the published connection information to establish a NAN connection between the display apparatus 100 and the terminal 300. Then, the display apparatus 100 may publish information on the requested service through the established NAN connection to the terminal 300.

Then, the processor 170 of the display apparatus 100 outputs content through at least one of the display 180 or the audio output interface 185 (S603).

The processor 170 may output sound data of the content to be output through the audio output interface 185, and output image data of the content to be output through the display 180.

The content to be output or an output target content may be content set by the user's input, may be default content, or may be content being output from the display apparatus 100 immediately before. Further, the content to be output may be streaming content received through the communication interface 110 or may be content stored in the memory 140.

Then, the processor 170 of the display apparatus 100 determines the position of the connected terminal 300 (S605).

The processor 170 can determine the position of the connected terminal 300 in consideration of a received signal strength indication (RSSI) or a round trip time (RTT) of a communication signal received from the connected terminal 300. In addition, the processor 170 of the display apparatus 100 may acquire image data for the front or the surroundings through a camera and acquire additional information (for example, direction information) about the position of the terminal 300 by recognizing the terminal 300 from the acquired image data.

The position of the terminal 300 may refer to a relative position, such as a distance or direction, to the display apparatus 100, or may refer to an absolute position on the map data.

Both RSSI and RTT may be used to determine the position of the connected terminal 300, but RTT may be more preferred than RSSI. In an indoor environment, a problem that the corresponding relationship between RSSI and a straight line distance is inaccurate due to the structure or obstacles of the indoor space may arise. On the other hand, since RTT represents a difference between transmission time and reception time of a specific communication signal regardless of the strength of a received communication signal, it has a rigid characteristic to environmental factors such as a structure or obstacles of an indoor space.

If the processor 170 is connected to a plurality of external devices, the processor 170 may determine the position of the connected terminal 300 using at least some of the connected plurality of devices. The plurality of devices may include a terminal 300, another display apparatus 100, other electronic devices, and the like. The processor 170 of the display apparatus 100 can receive RSSI, RTT, direction information, and the like from each of a plurality of external devices to the connected terminal 300, and determine the position of the terminal 300 using the triangulation technique or the like. As the more external devices are connected to the display apparatus 100, the position of the terminal 300 can be determined more accurately.

The processor 170 may determine the position of the connected terminal 300 in real-time or at predetermined intervals. It can be seen that the position of the terminal 300 which is connected to the display apparatus 100 is being continuously updated or tracked.

Then, the processor 170 of the display apparatus 100 determines whether the connected terminal 300 has left the viewing area (S607).

The processor 170 may grasp the movement of the user who carries the connected terminal 300 and, based on this, determine whether the connected terminal 300 or the user has left the viewing area. In other words, deviation from the viewing area of the terminal 300 may mean deviation from the viewing area of the user. The expression "the terminal 300 has left a viewing area" may mean the expression "the position of the terminal 300 is outside of a viewing area". Therefore, determining whether the connected terminal 300 has left the viewing area may mean determining whether the position of the connected terminal 300 is outside of the viewing area.

The viewing area may mean an area for viewing content through the display apparatus 100 and may mean an area in which the display apparatus 100 is installed. Furthermore, the viewing area may refer to a space in which the display apparatus 100 is installed and corresponding to a direction in which the display 180 of the display apparatus 100 faces. In other words, the processor 170 may determine whether the user carrying the connected terminal 300 has left the viewing area based on whether the connected terminal 300 has left the viewing area of the display apparatus 100.

The viewing area may be set for each display apparatus 100. In other words, each display apparatus 100 may determine whether the connected terminal 300 has left the viewing area based on the viewing area corresponding to each display apparatus 100.

The processor 170 can determine whether the terminal 300 has left the viewing area in consideration of at least one of a distance between the display apparatus 100 and the terminal 300, a positional relationship between the terminal 300 and another device, a user setting viewing area, or map data. For example, if the distance between the display apparatus 100 and the terminal 300 is greater than a predetermined reference distance, the processor 170 may determine that the terminal 300 has left the viewing area of the display apparatus 100. For example, if the distance between another display apparatus 100 and the terminal 300 is smaller than the distance between the display apparatus 100 and the terminal 300, the processor 170 may determine that the terminal 300 has left the viewing area of the display apparatus 100. For example, if the terminal 300 has left the user setting viewing area including the display apparatus 100 set by the user, the processor 170 may determine that the terminal 300 has left the viewing area of the display apparatus 100. For example, if the terminal 300 has left the zone including the display apparatus 100 among a plurality of zones included in the map data, the processor 170 may determine that the terminal 300 has left the viewing area of the display apparatus 100.

The user setting viewing area may mean a viewing area of the display apparatus 100 set by the user. In one embodiment, the processor 170 may determine a boundary of the user setting viewing area based on the viewing area deviation feedback for the terminal 300 and the position of the corresponding terminal 300. The viewing area deviation feedback for the terminal 300 may be feedback indicating whether the corresponding terminal 300 has left the viewing area of the display apparatus 100 or not. In addition, the viewing area deviation feedback may include feedback requesting that the content being output from the display apparatus 100 is output from the terminal 300.

The map data may mean map data generated based on sensor data collected while a movable device such as a robot cleaner or a pet robot moves in a space where the display apparatus 100 is installed. For example, the map data may be map data generated according to simultaneous localization and mapping (SLAM) technology. Map data may be divided into a plurality of zones. In an embodiment, a plurality of zones of map data may be set based on a user setting viewing area, and in this case, it can be seen that the user setting viewing area is set on the map data.

As a result of the determination in the step S607, if it is determined that the connected terminal 300 has left the viewing area, the processor 170 of the display apparatus 100 outputs content through the connected terminal 300 (S609).

When the processor 170 determines that the connected terminal 300 has left the viewing area, the processor 170 transmits a signal to the connected terminal 300 through the communication interface 110 to query whether to continuously play the content and when the processor 170 receives a response to consent to continue playing, the processor 170 may output the content through the connected terminal 300. Alternatively, the processor 170 of the display apparatus 100 may output content through the connected terminal 300 without a specific query when the processor 170 determines that the connected terminal 300 has left the viewing area. The display apparatus 100 may output content through the connected terminal 300 by transmitting the content output information to the connected terminal 300.

If the content is output through the connected terminal 300, the processor 170 may stop outputting the content through the audio output interface 185 and/or the display 180. The stopping of the output of the content may mean that, as to the display 180, power is turned off or the operation is deactivated and, as to the audio output interface 185 power is turned off, the operation is deactivated, or the sound is muted.

The processor 170 may not stop outputting content through the audio output interface 185 and/or the display 180 if it is determined that other viewers (or other users) exist even if the content is output through the connected terminal 300. For example, if the processor 170 is connected to another terminal other than the terminal 300 which is out of the viewing area or recognizes a user other than the user who carries the terminal 300 which is out of the viewing area from an image acquired through the camera, the processor 170 may output content together with the connected terminal 300.

At least three methods for outputting content through the connected terminal 300 may be considered. The first method is a method in which the processor 170 transmits content data corresponding to the content to be output to the terminal 300 through the communication interface 110, and the terminal 300 outputs the content based on the received content data. The second method is a method in which the processor 170 transmits screen data when outputting the content to the terminal 300 through the communication interface 110, and the terminal 300 outputs the content based on the received screen data. The third method is a method in which the processor 170 transmits connection information corresponding to the content to be output to the terminal 300 through the communication interface 110, and the terminal 300 outputs the content based on the received connection information. In the first method and the second method, the display apparatus 100 has to continuously transmitting data (content data or screen data) for outputting content to the terminal 300, and the terminal 300 can output content based on the data received from the display apparatus 100. The first method and the second method can be regarded as a type of screen mirroring or screen casting. The third method is sufficient even if the display apparatus 100 only transmits connection information for outputting content to the terminal 300 once, and the terminal 300 can receive content data from the content provider 500 corresponding to the received connection information to output the content. In other words, the content output information may mean content data, screen data when outputting content, or connection information corresponding to the content.

The connection information corresponding to the content may include access information (for example, address) to the content, playback position information, account information, channel information, and the like. The terminal 300 may receive content data corresponding to the content to be output based on the access information and/or account information included in the connection information and may output the content by synchronizing the playback position (or a playback time) in the display apparatus 100 based on the playback position information.

Among the three methods for outputting content from the above-described terminal 300, the third method can be applied if a separate content provider exists. In other words, the third method can be applied only in a situation in which the display apparatus 100 outputs the content received through the communication interface 110, and the third method cannot be applied in the situation in which the display apparatus 100 outputs the content stored in the memory 140. Therefore, in one embodiment, the processor 170 determines whether content can be output from the terminal 300 according to the third method, and if the third method is not available, the processor may output content at terminal 300 according to the first method or the second method.

In one embodiment, the processor 170 may transmit the content data with the adjusted resolution or the screen data with the adjusted resolution to the terminal 300 in consideration of the network environment.

As a result of the determination in the step S607, if it is determined that the connected terminal 300 has not left the viewing area, the processor 170 of the display apparatus 100 performs the step S605 of determining the position of the connected terminal 300.

The order of steps illustrated in FIG. 6 is only an example, and the present disclosure is not limited thereto. In other words, in one embodiment, some of the steps illustrated in FIG. 6 may be performed in changed order. Further, in one embodiment, some of the steps illustrated in FIG. 6 may be performed in parallel. Also, only some of the steps illustrated in FIG. 6 may be performed.

FIG. 7 is a view illustrating an embodiment in which a display apparatus provides content in connection with a user terminal.

Referring to FIG. 7, the terminal 730 of the user 740 is in a state of being connected to the display apparatus 710 and the user 740 may view the content output from the display apparatus 710 while carrying the terminal 730. In addition, the display apparatus 710 may determine deviation from the viewing area 720 of the terminal 730 or the user 740 based on the viewing area 720 for the display apparatus 710.

Referring to FIG. 7(a), the terminal 730 of the user 740 is positioned in the viewing area 720 for the display apparatus 710. Therefore, the display apparatus 710 may continue outputting the content that was being output.

Referring to FIG. 7(b), compared to FIG. 7(a), the user 740 moves while carrying the terminal 730, but the terminal 730 of the user 740 is still positioned in the viewing area 720 for the display apparatus 710. Therefore, the display apparatus 710 may continue outputting the content that was still being output.

Referring to FIG. 7(c), compared to FIG. 7(b), the user 740 has moved while carrying the terminal 730, and the terminal 730 of the user 740 has left a viewing area 720 for a display apparatus 710. Accordingly, the display apparatus 710 may determine that the user 740 has left the viewing area 720 and output content from the terminal 730 of the user 740.

In particular, the display apparatus 710 may determine that there are no other users or viewers other than the user 740 because no other terminal other than the terminal 730 of the user 740 is connected. Accordingly, when the display apparatus 710 outputs the content from the terminal 730 of the user 740, the display apparatus 710 may stop outputting the content from the display apparatus 710.

FIG. 8 is a view illustrating an embodiment in which a display apparatus provides content in connection with a user terminal.

Referring to FIG. 8, the terminal 730 of the user 740 is in a state of being connected to the display apparatus 710, and the user 740 while carrying the terminal 730, and thus the user 740 may view content output from the display apparatus 710. In addition, the display apparatus 710 may determine deviation from the viewing area 720 of the terminal 730 or the user 740 based on the viewing area 720 for the display apparatus 710.

Referring to FIG. 8(a), the terminal 730 of the user 740 is positioned in the viewing area 720 for the display apparatus 710. Therefore, the display apparatus 710 may continue outputting the content that was being output.

Referring to FIG. 8(b), compared to FIG. 8(a), the user 740 moves while carrying the terminal 730 and the terminal 730 of the user 740 has left the viewing area for the display apparatus 710. Accordingly, the display apparatus 710 may determine that the user 740 has left the viewing area 720 and may output 811 a notification querying whether to output content on the terminal 730 such as "Do you want to continue viewing content?" through the terminal 730 of the user 740 to the user 740.

The display apparatus 710 may output a text notification or an image notification querying whether to output the content from the terminal 710 through the display 180 or the display (not illustrated) of the terminal 730 and, through the audio output interface 185 or the audio output interface (not illustrated) of the terminal 730, a voice notification querying whether to output content from the terminal 730 may be output.

Queries or notifications as to whether to output content in connection with the terminal 730 of the user 740 may be activated or deactivated by the setting of the user 740, and the setting value may be stored in a display apparatus 710 or a terminal 730. In particular, the setting value for queries or notifications may include three values: activation (automatic switching ON), and deactivation (automatic switching OFF). Activation may mean a setting value that always queries whether to output the content on the terminal 730 (or whether to switch the content output device) and determines whether to output the content on the terminal 730 according to the query result. Deactivation (automatic switching ON) may mean a setting value that automatically outputting content on the terminal 730 without querying whether to output the content on the terminal 730. Deactivation (automatic switching OFF) may mean a setting value that not outputting content on the terminal 730 without querying whether to output the content on the terminal 730.

Referring to FIG. 8(c), the display apparatus 710 queries 811 whether to output content in connection with the terminal 730 and, if the consent of the user 740 is confirmed, the display apparatus 710 may output the content on the user 740 of the terminal 730.

The consent of the user 740 may include an explicit consent voice, an implied consent voice, a preset consent gesture, and input of consent entered into the input interface of the user 740.

FIG. 9 is a view illustrating an embodiment in which a display apparatus provides content in connection with a user terminal.

Referring to FIG. 9, the first terminal 730_1 of the first user 740_1 and the second terminal 730_2 of the second user 740_2 are in a state of being connected to the display apparatus 710, and the first user 740_1 and the second user 740_2 may view content output from the display apparatus 710 while carrying the first terminal 730_1 and the second terminal 730_2, respectively. In addition, the display apparatus 710 may determine the deviation from the viewing area 720 of the first terminal 730_1, the second terminal 730_2, the first user 740_1, or the second user 740_2 based on the viewing area 720 for the display apparatus 710.

Referring to FIG. 9(a), the first terminal 730_1 of the first user 740_1 and the second terminal 730_2 of the second user 740_2 are positioned in the viewing area 720 for the display apparatus 710. Therefore, the display apparatus 710 may continue outputting the content that was being output.

Referring to FIG. 9(b), compared to FIG. 9(a), the first user 740_1 has moved while carrying the first terminal 730_1, but the first terminal 730_1 of the first user 740_1 is still positioned in the viewing area 720 for the display apparatus 710. Accordingly, the first terminal 730_1 of the first user 740_1 and the second terminal 730_2 of the second user 740_2 are positioned in the viewing area 720 for the display apparatus 710, and accordingly, the display apparatus 710 may continue outputting the content that was still being output.

Referring to FIG. 9(c), compared to FIG. 9(b), the first user 740_1 has moved while the first terminal 730_1, and the first terminal 730_1 of the first user 740_1 is out of the viewing area 720 for the display apparatus 710. Accordingly, the display apparatus 710 may determine that the first user 740_1 has left the viewing area 720 and output content on the first terminal 730_1 of the first user 740_1.

However, the display apparatus 710 is connected to the second terminal 730_2 of the second user 740_2 in addition to the first terminal 730_1 of the first user 740_1, and the display apparatus 710 may grasp that the second terminal 730_2 of the second user 740_2 is still positioned in the viewing area 720 for the display apparatus 710. Therefore, even if the display apparatus 710 outputs the content on the first terminal 730_1 of the first user 740_1, the content output from the display apparatus 710 may not be stopped so that the second user 740_2 can view the content. In other words, the display apparatus 710 may continue outputting the content being output and simultaneously output the content through the first terminal 730_1 of the first user 740_1.

Although not illustrated in FIG. 9, if the second terminal 730_2 of the second user 740_2 has left the viewing area 720 for the display apparatus 710 in the situation of FIG. 9(c), the display apparatus 710 may determine that the second user 740_2 is out of the viewing area 720 and output content on the second terminal 730_1 of the second user 740_2. In this case, since the first user 740_1 as well as the second user 740_2 have left the viewing area 720 for the display apparatus 710 and there is no other terminal connected to the display apparatus 710 other than the first terminal 730_1 of the first user 740_1 and the second terminal 730_2 of the second user 740_2, the display apparatus 710 may determine that there is no other user or viewer except the first user 740_1 and the second user 740_2. Accordingly, when the display apparatus 710 may output content on the first terminal 730_1 of the first user 740_1 and the second terminal 730_2 of the second user 740_2, and stop outputting the content on the display apparatus 710.

Figure 10:
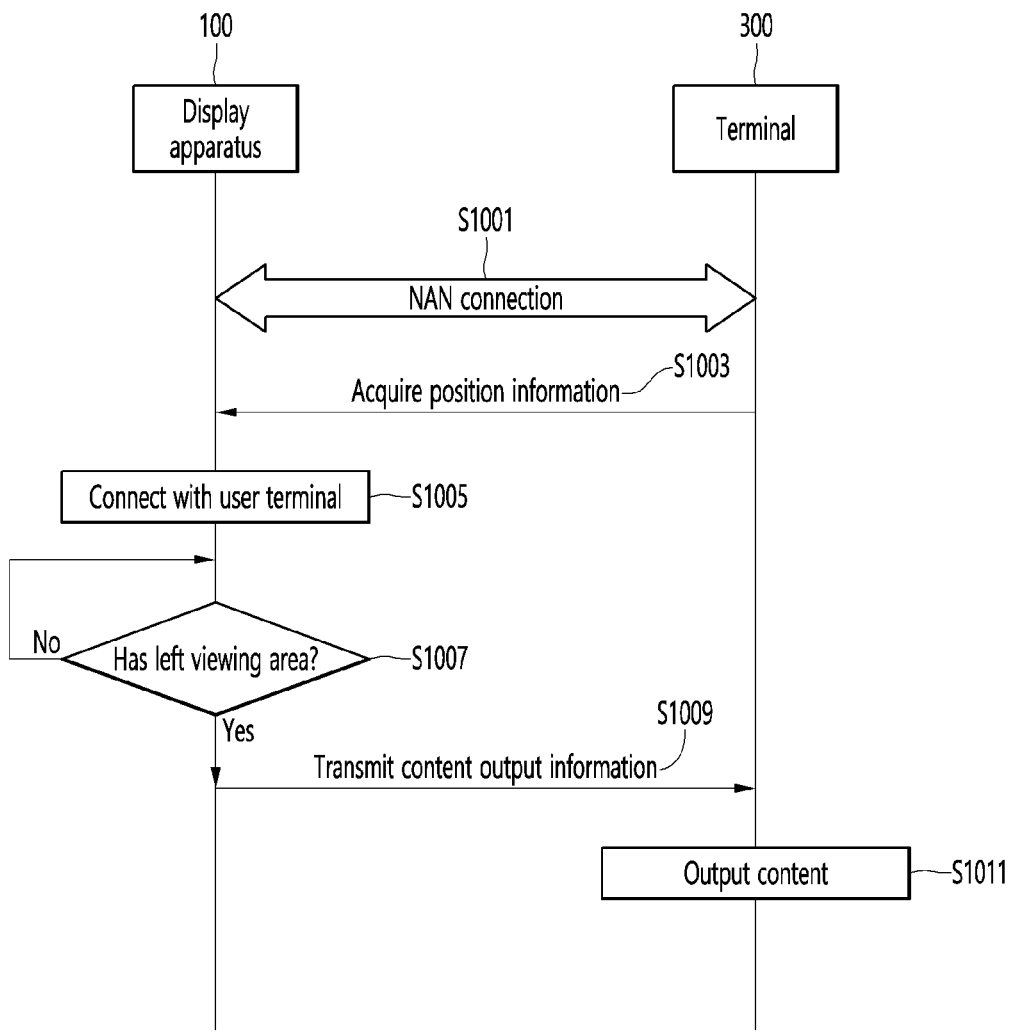
FIG. 10 is a ladder diagram illustrating a method for providing content in connection with a user terminal according to an embodiment of the present disclosure.

FIG. 10 is a ladder diagram illustrating a method for providing content in connection with a user terminal according to an embodiment of the present disclosure.

Referring to FIG. 10, a NAN connection is established between the display apparatus 100 and the terminal 300 (S1001), and the display apparatus 100 acquires position information for the terminal 300 on which the NAN connection is established (S1003). The display apparatus 100 may acquire position information for the terminal 300 in real-time or at predetermined intervals while the connection with the terminal 300 is maintained. Since the display apparatus 100 acquires position information for the connected terminal 300, the step S1003 of acquiring position information for the terminal 300 is performed after the step S1001 of establishing a NAN connection is performed.

If a NAN connection is established between the display apparatus 100 and the terminal 300, it can be seen that the display apparatus 100 and the terminal 300 are paired, and each of the display apparatus 100 and the terminal 300 may store pairing information.

Then, the display apparatus 100 outputs the output target content (S1005).

Although FIG. 10 illustrates that the display apparatus 100 outputs content after the display apparatus 100 and the terminal 300 are connected, the present disclosure is not limited thereto. In other words, the order performing the step S1001 in which the display apparatus 100 and the terminal 300 establish a NAN connection and the step S1005 in which the display apparatus 100 outputs content may be reversed or the steps can also be performed in parallel with each other.

Then, the display apparatus 100 determines whether the connected terminal 300 has left the viewing area of the display apparatus 100 (S1007).

As a result of the determination in the step S1007, if the terminal 300 has not left the viewing area of the display apparatus 100, the display apparatus 100 continues performing the step (S1007) of determining whether the terminal 300 has left the viewing area of the display apparatus 100.

As a result of the determination in the step S1007, if the terminal 300 has left the viewing area of the display apparatus 100, the display apparatus 100 transmits content output information to the terminal 300 (S1009), and the terminal 300 outputs the content based on the received content output information (S1011).

As described above, the content output information may mean content data, screen data when outputting content, or connection information corresponding to the content. If the display apparatus 100 receives content data from a separate content provider 500 or another external device, the display apparatus 100 may transmit content data received by the terminal 300, screen data outputting content, or the connection information corresponding to the content, and the terminal 300 may output content based on the received information. Whereas, if the display apparatus 100 outputs content stored in the memory 140, the display apparatus 100 may transmit content data stored in the terminal 300 or screen data outputting content, and the terminal 300 may output content based on the received information.

Figure 11:
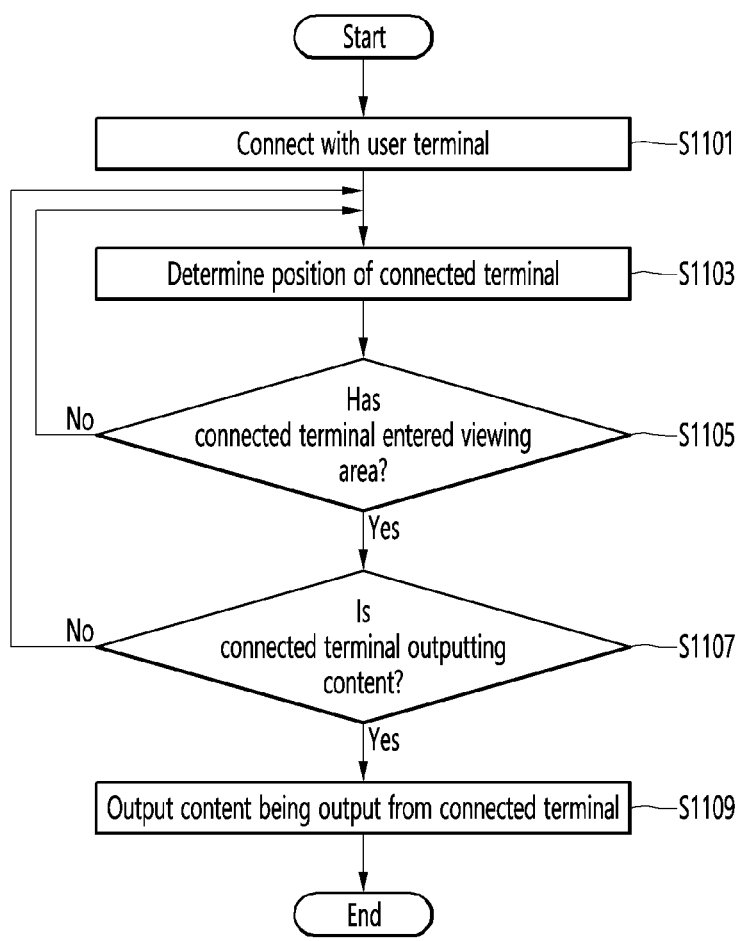
FIG. 11 is an operation flowchart illustrating a method for providing content in connection with a terminal according to an embodiment of the present disclosure.

FIG. 11 is an operation flowchart illustrating a method for providing content in connection with a terminal according to an embodiment of the present disclosure.

Referring to FIG. 11, the processor 170 of the display apparatus 100 connects with the user's terminal 300 through the communication interface 110 (S1101). This step S1101 corresponds to the step S601 of connecting to the terminal 300 illustrated in FIG. 6, and the duplicate description is omitted.

Then, the processor 170 of the display apparatus 100 determines the position of the connected terminal 300 (S1103). This step S1103 corresponds to the step S605 of determining the position of the connected terminal 300 illustrated in FIG. 6, and the duplicate description is omitted.

Then, the processor 170 of the display apparatus 100 determines whether the connected terminal 300 has entered the viewing area (S1105).

The processor 170 may grasp the movement of the user carrying the connected terminal 300 based on the change in the position of the connected terminal 300 and determine whether the connected terminal 300 or the user has entered the viewing area based on the movement of the user. In other words, entering the viewing area of the terminal 300 may mean entering the viewing area of the user. The expression "the terminal 300 has entered a viewing area" may mean the expression "the position of the terminal 300 is inside of a viewing area". Therefore, determining whether the connected terminal 300 has entered the viewing area may mean determining whether the position of the connected terminal 300 is inside of the viewing area.

The viewing area means an area for viewing content through the display apparatus 100 and may mean an area in which the display apparatus 100 is installed. Furthermore, the viewing area may mean a space in which the display apparatus 100 is installed and which corresponds to a direction in which the display 180 of the display apparatus 100 faces. In other words, the processor 170 may determine whether the user carrying the connected terminal 300 has entered the viewing area based on whether the connected terminal 300 enters the viewing area of the display apparatus 100.

The viewing area may be set for each display apparatus 100. In other words, each display apparatus 100 may determine whether the connected terminal 300 has entered the viewing area based on the viewing area corresponding to the display apparatus.

As a result of the determination in the step S1105, if it is determined that the connected terminal 300 has not entered the viewing area, the processor 170 of the display apparatus 100 performs the step S1103 of determining the position of the connected terminal 300.

As a result of the determination in the step S1105, if it is determined that the connected terminal 300 has entered the viewing area, the processor 170 of the display apparatus 100 determines whether content is being output on the connected terminal 300 (S1107).

The connected terminal 300 may be outputting content in a state of being in connection with the display apparatus 100 or in a state of not being in connection with the display apparatus 100. The connected terminal 300 may output content through at least one of a display (not illustrated) or an audio output interface (not illustrated).

The content to be output or the output target content may be content set by the user's input, may be default content, or may be content output from the display apparatus 100 right before. Further, the content to be output may be streaming content received through a communication unit (not illustrated) or may be content stored in a memory (not illustrated).

As a result of the determination in the step S1107, if it is determined that the connected terminal 300 is outputting content, the processor 170 of the display apparatus 100 outputs the content being output from the connected terminal 300 through at least one of the display 180 or the audio output interface 185 (S1109).

The processor 170 may request content output information to the terminal 300 connected through the communication interface 110 and output content being output from the connected terminal 300 based on the content output information received from the terminal 300.

The processor 170 may output sound data of the content to be output through the audio output interface 185 and output image data of the content to be output through the display 180.

When it is determined that the connected terminal 300 enters the viewing area and is outputting content, the processor 170 transmits a signal querying whether to continuously play the content to the connected terminal 300 through the communication interface 110, and when a response to consent to continue playback is received from the connected terminal 300, the content being output from the connected terminal 300 may be output through at least one of the display 180 or the audio output interface 185. Alternatively, when it is determined that the connected terminal 300 has entered the viewing area and is outputting the content, the processor 170 of the display apparatus 100 may output the content being output from the connected terminal 300 through at least one of the display 180 or the audio output interface 185 without any other query. The display apparatus 100 may output content being output from the connected terminal 300 by receiving content output information from the connected terminal 300.

If the display apparatus 100 outputs the content being output from the connected terminal 300, according to embodiments, the connected terminal 300 may stop outputting the content or continuously output the content.

At least three methods may be considered for outputting the content from the display apparatus 100, similar to outputting the content through the terminal 300. The first method is a method in which the display apparatus 100 receives content data corresponding to the content being output from the terminal 300 and outputs the content. The second method is a method in which the display apparatus 100 receives screen data corresponding to the content being output from the terminal 300 and outputs the content. The third method is a method in which the display apparatus 100 receives connection information corresponding to the content being output from the terminal 300 and outputs the content.

As a result of the determination in the step S1107, if it is determined that the connected terminal 300 is not outputting content, the processor 170 of the display apparatus 100 performs the step S1103 of determining the position of the connected terminal 300.

The order of the steps illustrated in FIG. 11 is only an example, and the present disclosure is not limited thereto. In other words, in one embodiment, some of the steps illustrated in FIG. 11 may be performed in changed order. Further, in one embodiment, some of the steps illustrated in FIG. 6 may be performed in parallel. Also, only some of the steps illustrated in FIG. 11 may be performed.

FIG. 12 is a view illustrating an embodiment in which a display apparatus provides content in connection with a user terminal.

Referring to FIG. 12, the terminal 1230 of the user 1240 is in a state of being connected to the display apparatus 1210, the display apparatus 1210 is not outputting content, and the user 1240 may view content through the terminal 1230 outside the viewing area 1220 of the display apparatus 1210 while carrying the terminal 1230. Then, the display apparatus 1210 may determine that the terminal 1230 or the user 1240 enters the viewing area 1220 based on the viewing area 1220 for the display apparatus 1210.

Referring to FIG. 12(*a*), the terminal 1230 of the user 1240 is positioned outside the viewing area 1220 for the display apparatus 1210. Therefore, the terminal 1230 may continue outputting the content that was being output.

Referring to FIG. 12(*b*), compared to FIG. 12(*a*), the user 1240 moves while carrying the terminal 1230, and the terminal 1230 of the user 1240 has entered the viewing area 1220 for the display apparatus 1210. Therefore, the display apparatus 1210 may determine that the user 1240 has entered the viewing area 1220, and, through the terminal 1230 of the user 1240, the display apparatus 1210 may output a notification querying whether to output content on the display apparatus 1210, such as "would you like to continue viewing the content through TV?.

The display apparatus 1210 may output a text notification or an image notification to query whether to output the content on the display apparatus 1210 through the display 180 or the display (not illustrated) the terminal 1230, or the display apparatus 1210 may output a voice notification querying whether to output content on the display apparatus 1210 through the audio output interface 185 or the audio output interface (not illustrated) of the terminal 1230.

Queries or notifications as to whether to output content in connection with the terminal 1230 of the user 1240 may be activated or deactivated by the setting of the user 1240, and these setting values may be stored in the display apparatus 1210 or terminal 1230. In particular, the setting values for queries or notifications may include three values: activation, deactivation (automatic switching ON), and deactivation (automatic switching OFF). Activation may mean a setting value that always queries whether to output the content on the display apparatus 1210 (or whether to switch the content output device) and determines whether to output the content on the display apparatus 1210 according to the query result. Deactivation (automatic switching ON) may mean a setting value that automatically outputting content on the display apparatus 1210 without querying whether to output the content on the display apparatus 1210. Deactivation (automatic switching OFF) may mean a setting value that not outputting the content from the display apparatus 1210 without querying whether to output the content on the display apparatus 1210.

Referring to FIG. 12 (*c*), if the display apparatus 1210 queries 1211 whether to output content in connection with the terminal 1230 and confirms the consent of the user 1240, the display apparatus 1210 may output content being output from the terminal 1230 of the user 1240. In addition, the terminal 1230 of the user 1240 may stop outputting the content. In this case, the terminal 1230 may turn on or activate the operation of the display apparatus 1210 through Wake on LAN (WoL), Wake on Wireless LAN (WoWLAN), or Wake on BLE (WoBLE).

The consent of the user 1240 may include an explicit consent voice, an implicit consent voice, a preset consent gesture, input of consent input to the input unit of the user 1240, or the like.

Although FIG. 12 illustrates an example in which the terminal 1230 enters the viewing area 1220 of the display apparatus 1210 in a situation where the display apparatus 1210 is not outputting content, the present disclosure is not limited thereto. In other words, even if the display apparatus 1210 is outputting the first content and the terminal 1230 outputting the second content enters the viewing area 1220 of the display apparatus 1210, the display apparatus 1210 may output the second content being output from the terminal 1230 instead of the first content. Even in this case, according to an embodiment, the display apparatus 1210 may query the user 1240 whether to continue outputting the second content and determine whether to output the second content based on the response to the query.

Figure 13:
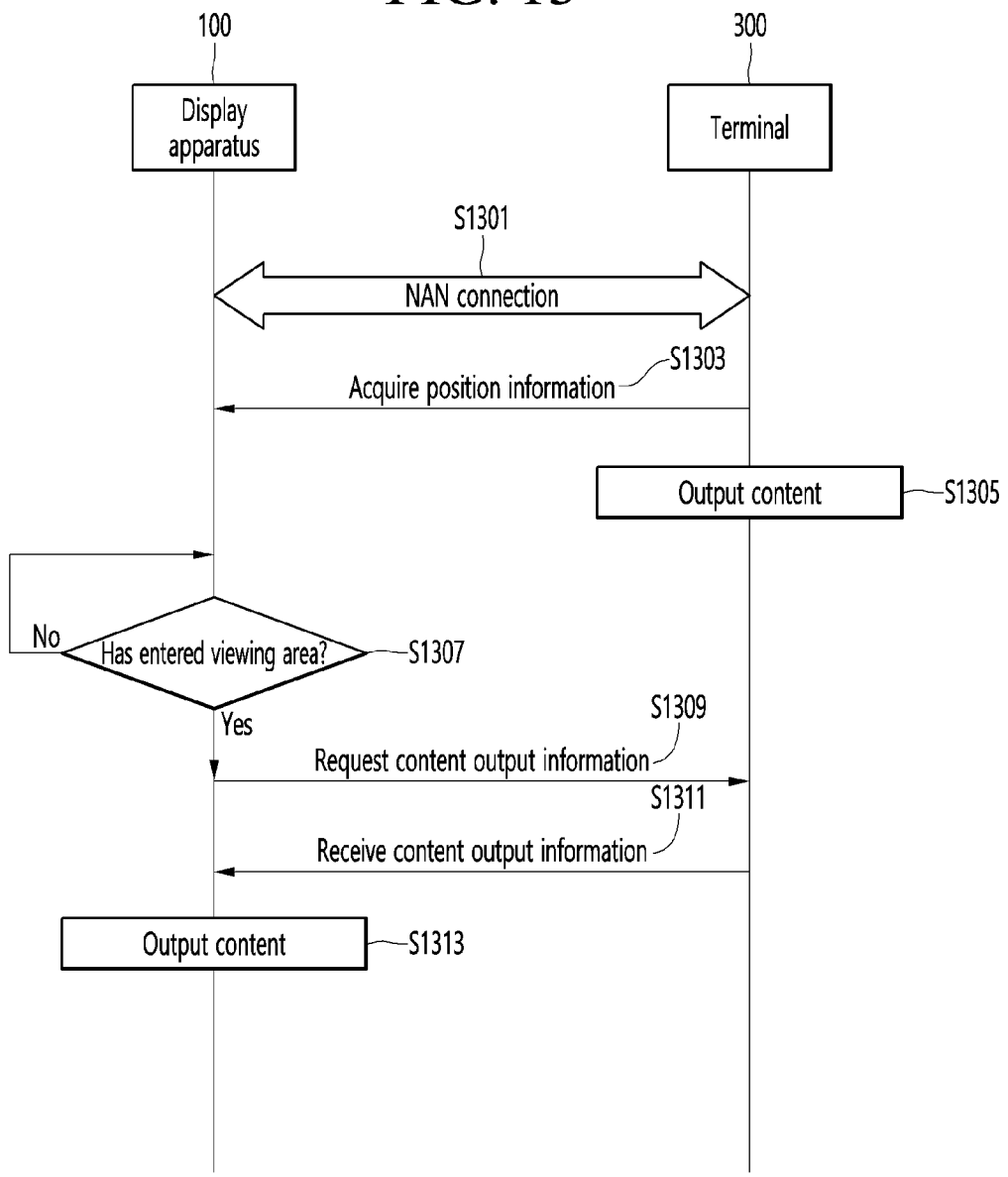
FIG. 13 is a ladder diagram illustrating a method for providing content in connection with a user terminal according to an embodiment of the present disclosure.

FIG. 13 is a ladder diagram illustrating a method for providing content in connection with a user terminal according to an embodiment of the present disclosure.

Referring to FIG. 13, a NAN connection is established between the display apparatus 100 and the terminal 300 (S1301), and the display apparatus 100 acquires position information for the terminal 300 on which the NAN connection is established (S1303). The display apparatus 100 may acquire position information for the terminal 300 in real-time or at predetermined intervals while the connection with the terminal 300 is maintained. Since the display apparatus 100 acquires position information for the connected terminal 300, the step S1303 of acquiring position information for the terminal 300 is performed after the step S1301 of establishing a NAN connection is performed.

If a NAN connection is established between the display apparatus 100 and the terminal 300, it can be seen that the display apparatus 100 and the terminal 300 are paired, and each of the display apparatus 100 and the terminal 300 may store pairing information.

Then, the terminal 300 outputs the output target content (S1305).

Although FIG. 13 illustrates that the terminal 300 outputs content after the display apparatus 100 and the terminal 300 are connected, the present disclosure is not limited thereto. In other words, the order performing the step S1301 in which the display apparatus 100 and the terminal 300 establish a NAN connection and the step S1305 in which the terminal 300 outputs content may be reversed and the steps may be performed in parallel with each other.

Then, the display apparatus 100 determines whether the connected terminal 300 has entered the viewing area of the display apparatus 100 (S1307).

As a result of the determination in the step S1307, if the terminal 300 has not entered the viewing area of the display apparatus 100, the display apparatus 100 continues performing the step S1307 of determining whether the terminal 300 has entered the viewing area of the display apparatus 100.

As a result of the determination in the step S1307, if the terminal 300 enters the viewing area of the display apparatus 100, the display apparatus 100 requests content output information to the terminal 300 (S1309), and receives content output information (S1311), and outputs content based on the received content output information (S1313).

As described above, the content output information may mean content data, screen data when outputting content, or connection information corresponding to the content. If the terminal 300 receives content data from a separate content provider 500 or another external device, the terminal 300 may transmit the content data received from the display apparatus 100, screen data outputting content, or connection information corresponding to the content, and the display apparatus 100 may output the content based on the received information. Wheras, if the terminal 300 outputs content stored in a memory (not illustrated), the terminal 300 may transmit content data stored in the display apparatus 100 or screen data outputting content, and the display apparatus 100 may output content based on the received information.

FIG. 14 is a view illustrating an embodiment in which a plurality of display apparatus provide content in connection with a user terminal.

Referring to FIG. 14, the terminal 1430 of the user 1440 is in a state of being connected to the first display apparatus 1410_1, and the user 1440 may view the content output from the first display apparatus 1410_1 while carrying the terminal 1430. In addition, the first display apparatus 1410_1 may determine whether the terminal 1430 or the user 1440 has left the first viewing area 1420_1 based on the first viewing area 1420_1 for the first display apparatus 1410_1.

Referring to FIG. 14(*a*), the terminal 1430 of the user 1440 is positioned in the first viewing area 1420_1 for the first display apparatus 1410_1. Therefore, the first display apparatus 1410_1 may continue outputting the content that was being output. In addition, the second display apparatus 1410_2 is in a state where no content is output, and the terminal 1430 of the user 1440 is positioned outside the second viewing area 1420_2 of the second display apparatus 1410_2.

Referring to FIG. 14(*b*), compared to FIG. 14(*a*), the user 1440 has moved in a state while carrying the terminal 1430, and the terminal 1430 of the user 1440 has left the first viewing area 1420_1 for the first display apparatus 1410_1. Accordingly, the first display apparatus 1410_1 may determine that the user 1440 has left the first viewing area 1420_1 and may output content on the terminal 1430 of the user 1440. Then, the first display apparatus 1410_1 may stop outputting the content.

Referring to FIG. 14(*c*), compared to FIG. 14(*b*), the user 1440 has moved in a state while carrying the terminal 1430, and the terminal 1430 of the user 1440 has been entered the second viewing area 1420_2 for the second display apparatus 1410_2. Accordingly, the second display apparatus 1410_2 may determine that the user 1440 has entered the second viewing area 1420_2 and output the content being output from the terminal 1430 of the user 1440 on the second display apparatus 1410_2. In addition, the terminal 1430 of the user 1440 may stop outputting the content.

Although FIG. 14 does not disclose a configuration for outputting a notification querying whether to output content from the terminal 1430 or the second display apparatus 1410_2, the present disclosure is not limited thereto. In other words, the first display apparatus 1410_1 or the second display apparatus 1410_2 may output a notification querying whether to output content on the terminal 1430 or the second display apparatus 1410_2 and determine whether to output the content based on response corresponding the notification.

FIG. 15 is a view illustrating an embodiment in which a plurality of display apparatus provide content in connection with a user terminal.

Referring to FIG. 15, the first terminal 1430_1 of the first user 1440_1 and the second terminal 1430_2 of the second user 1440_2 are in a state of being connected to the first display apparatus 1410_1 and the second display apparatus 1410_2, respectively, and the first user 1440_1 and the second user 1440_2 may view the content output from the first display apparatus 1410_1 while carrying the first terminal 1430_1 and the second terminal 1430_2, respectively. Then, the first display apparatus 1410_1 may determine that the first terminal 1430_1, the second terminal 1430_2, the first user 1440_1, or the second user 1440_2 has left the first viewing area 1420_1 based on the first viewing area 1420_2 for the first display apparatus 1410_1.

Referring to FIG. 15(*a*), the first terminal 1430_1 of the first user 1440_1 and the second terminal 1430_2 of the second user 1440_2 are positioned in the first viewing area 1420_1 for the first display apparatus 1410_1. Therefore, the first display apparatus 1410_1 may continue outputting the content that was being output. In addition, the second display apparatus 1410_2 is in a state where no content is output, and the first terminal 1430_1 of the first user 1440_1 and the second terminal 1430_2 of the second user 1440_2 are positioned outside the second viewing area 1420_2 of the second display apparatus 1410_2.

Referring to FIG. 15(*b*), compared to FIG. 15(*a*), the first user 1440_1 has moved while carrying the first terminal 1430_1, and the first terminal 1430_1 of the first user 1440_1 has left the first viewing area 1420_1 for the first display apparatus 1410_1. Accordingly, the first display apparatus 1410_1 may determine that the first user 1440_1 has left the first viewing area 1420_1 and output content on the first terminal 1430_1 of the first user 1440_1.

However, the first display apparatus 1410_1 is connected not only to the first terminal 1430_1 of the first user 1440_1 but also to the second terminal 1430_2 of the second user 1440_2, and may grasp that the second terminal 1430_2 of the second user 1440_2 is still positioned in the first viewing area 1420_1 for the first display apparatus 1410_1. Therefore, even if the first display apparatus 1410_1 outputs the content on the first terminal 1430_1 of the first user 1440_1, the output of the content may not be stopped on the first display apparatus 1410_1 so that the second user 1420_2 may view the content. In other words, the first display apparatus 1410_1 may continue outputting the content being output and at the same time, output the content through the first terminal 1430_1 of the first user 1440_1.

Referring to FIG. 15(*c*), compared to FIG. 15(*b*), the first user 1440_1 has moved while carrying the first terminal 1430_1, and the first terminal 1430_1 of the first user 1440_1 has entered the second viewing area 1420_2 for the second display apparatus 1410_2. Accordingly, the second display apparatus 1410_2 may determine that the first user 1440_1 has entered the second viewing area 1420_2 and output the content being output from the first terminal 1430_1 of the first user 1440_1 on the second display apparatus 1410_2. Then, the first terminal 1430_1 of the first user 1440_1 may stop outputting the content.

Although FIG. 15 does not disclose a configuration for outputting a notification querying whether to output content on the first terminal 1430_1 or the second display apparatus 1410_2, the present disclosure is not limited thereto. In other words, the first display apparatus 1410_1 or the second display apparatus 1410_2 may output a notification querying whether to output content on the first terminal 1430_1 or the second display apparatus 1410_2 and determine whether to output the content based on the response corresponding to the notification.

Figure 16:
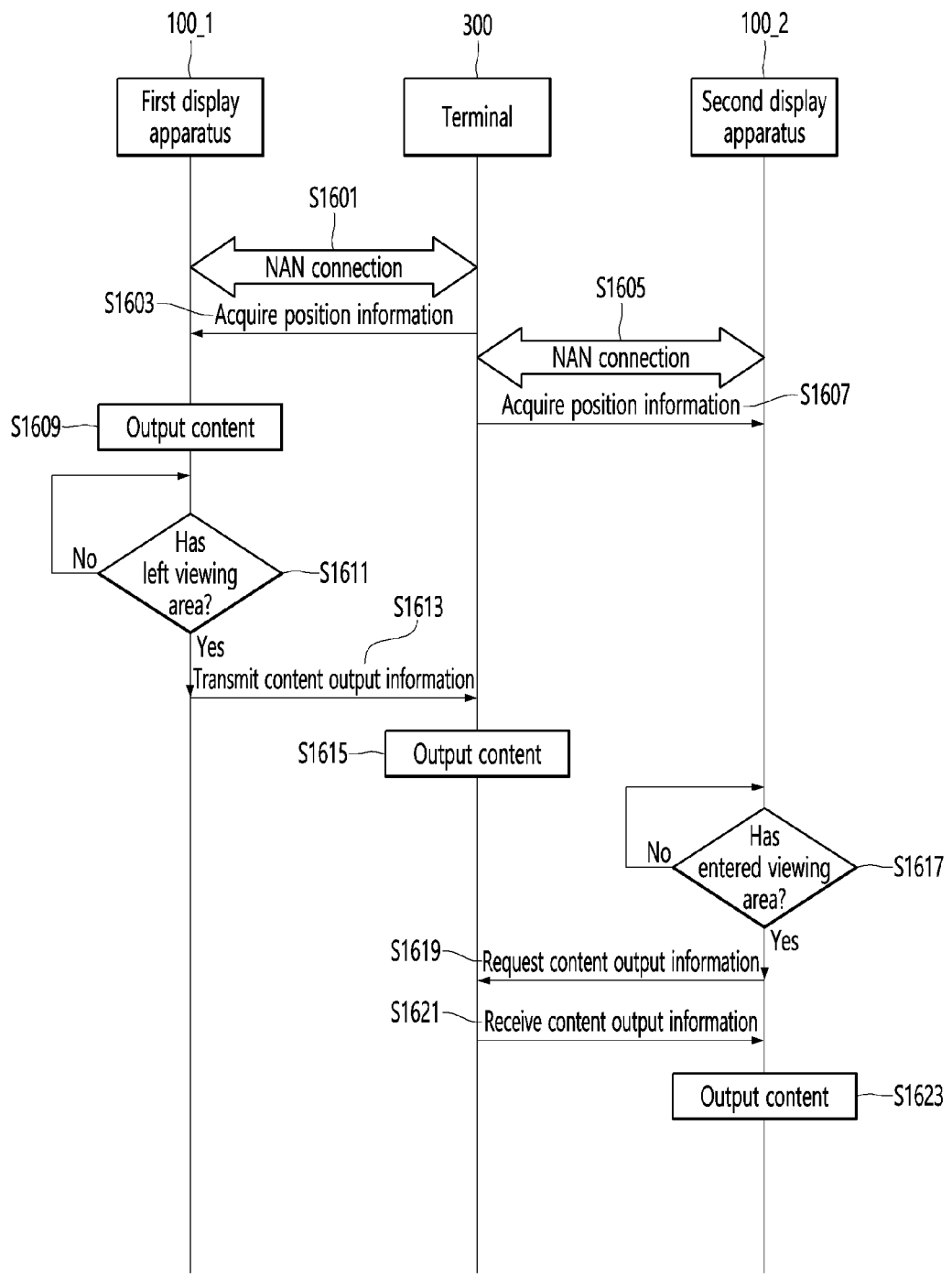
FIG. 16 is a ladder diagram illustrating a method for providing content in connection with a user terminal according to an embodiment of the present disclosure.

FIG. 16 is a ladder diagram illustrating a method for providing content in connection with a user terminal according to an embodiment of the present disclosure.

Referring to FIG. 16, a NAN connection is established between the first display apparatus 100_1 and the terminal 300 (S1601), and the first display apparatus 100_1 acquires position information for the terminal 300 on which the NAN connection is established (S1603). The first display apparatus 100_1 may acquire position information for the terminal 300 in real-time or at predetermined intervals while the connection with the terminal 300 is maintained. Since the first display apparatus 100_1 acquires position information for the connected terminal 300, the step S1603 of acquiring position information for the terminal 300 is performed after the step S1601 of establishing a NAN connection is performed.

Then, a NAN connection is established between the second display apparatus 100_2 and the terminal 300 (S1605), and the second display apparatus 100_2 acquires position information for the terminal 300 on which the NAN connection is established (S1607). The second display apparatus 100_2 may acquire position information for the terminal 300 in real-time or at predetermined intervals while the connection with the terminal 300 is maintained. Since the second display apparatus 100_2 acquires position information for the connected terminal 300, the step S1607 of acquiring position information for the terminal 300 is performed after the step S1605 of establishing a NAN connection is performed.

Although FIG. 16 illustrates that after the first display apparatus 100_1 and the terminal 300 establish a NAN connection, the second display apparatus 100_2 and the terminal 300 establish a NAN connection, the present disclosure is not limited thereto. In other words, the time when the first display apparatus 100_1 and the terminal 300 establish a NAN connection and the time when the second display apparatus 100_2 and the terminal 300 establish a NAN connection may be mutually independent and be performed in parallel with each other, or be reversed. In addition, the NAN connection between the first display apparatus 100_1 and the terminal 300 and the NAN connection between the second display apparatus 100_2 and the terminal 300 need not be maintained at the same time.

Then, the first display apparatus 100_1 outputs the output target content (S1609).

Although FIG. 16 illustrates that the first display apparatus 100_1 outputs content after the first display apparatus 100_1 and the terminal 300 are connected, the present disclosure is not limited thereto. In other words, the order of performing the step S1601 in which the first display apparatus 100_1 and the terminal 300 establish a NAN connection and the step S1609 in which the first display apparatus 100_1 output the content may be changed, or the steps may be performed in parallel with each other.

Then, the first display apparatus 100_1 determines whether the connected terminal 300 has left the viewing area of the first display apparatus 100_1 (S1611).

As a result of the determination in the step S1611, if the terminal 300 has not left the viewing area of the first display apparatus 100_1, the first display apparatus 100_1 continues performing the step S1611 of determining whether the terminal 300 has left the viewing area of the first display apparatus 100_1.

As a result of the determination in the step S1611, if the terminal 300 has left the viewing area of the first display apparatus 100_1, the first display apparatus 100_1 transmits content output information to the terminal 300 (S1613), and the terminal 300 outputs the content based on the received content output information (S1615).

Then, the second display apparatus 100_2 determines whether the connected terminal 300 has entered the viewing area of the second display apparatus 100_2 (S1617).

As a result of the determination in the step S1617, if the terminal 300 has not entered the viewing area of the second display apparatus 100_2, the second display apparatus 100_2 continues performing the step S1617 of determining whether the terminal 300 has entered the viewing area of the second display apparatus 100_2.

As a result of the determination in the step S1617, if the terminal 300 has entered the viewing area of the second display apparatus 100_2, the second display apparatus 100_2 requests content output information to the terminal 300 (S1619), receives content output information from the terminal 300 (S1621) and outputs content based on the received content output information (S1623).

In one embodiment, the first display apparatus 100_1 or the second display apparatus 100_2 may function as a hub device or a main display apparatus, and the main display apparatus may instead determine whether the user terminal 300 has entered the viewing area of another display apparatus (or sub-display apparatus). For example, if the first display apparatus 100_1 is a main display apparatus, the first display apparatus 100_1 may determine whether the terminal 300 enters the viewing area of the second display apparatus 100_2, and if the terminal 300 enters the viewing area of the second display apparatus 100_2, the first display 100_1 may control the terminal 300 to output content through the second display apparatus 100_2.

Figure 17:
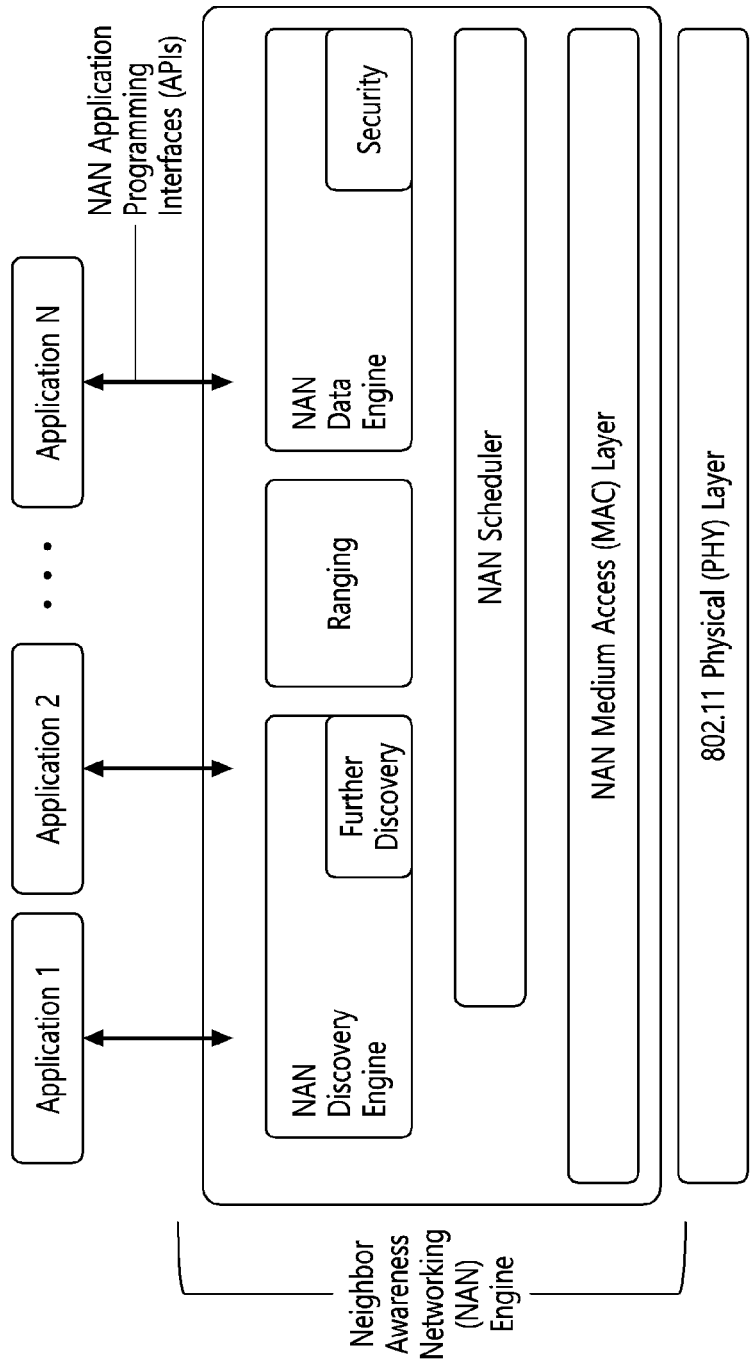
FIG. 17 is a view illustrating an example of a structure of a NAN terminal.

FIG. 17 is a view illustrating an example of a structure of a NAN terminal.

The NAN terminal means a terminal that performs NAN communication and may refer to both the display apparatus 100 and the terminal 300 in the present disclosure.

Referring to FIG. 17, the NAN terminal is based on the physical layer of 802.11, and the NAN APIs for the NAN engine and each application (Application 1, Application 2, Application N) are the main components.

The NAN engine may include a NAN Discovery Engine, a Ranging Engine, a NAN Data Engine, a NAN Scheduler, and a NAN Medium Access Control (MAC).

Service requests and responses are processed through the NAN discovery engine, and the NAN MAC may process NAN beacon frames and NAN service discovery frames. The NAN Discovery Engine may provide the functions of Subscribe, Publish, and Follow-up. The publish/subscribe function operates through the service interface from the service/application. If the publish/subscribe command is executed, an instance of the publish/subscribe function is created. Each instance is driven independently, and depending on the implementation, multiple instances may be driven at the same time. The follow-up function is a means for a service/application that transmits and receives service-specific information.

The ranging engine may measure the distance of other NAN terminals connected by the NAN connection.

The NAN data engine may transmit/receive data by specifying another NAN terminal connected by the NAN connection, a data path, and data to be transmitted/received.

The connection distance for establishing a NAN connection between the NAN terminals and the data transmission/reception distance for transmitting and receiving data may be different from each other, and the connection distance may be larger than a data transmission/reception distance. The NAN terminal measures a distance from another NAN terminal connected by the NAN connection and transmits/receives data required if the measured distance is within the data transmission/reception distance.

Figure 18:
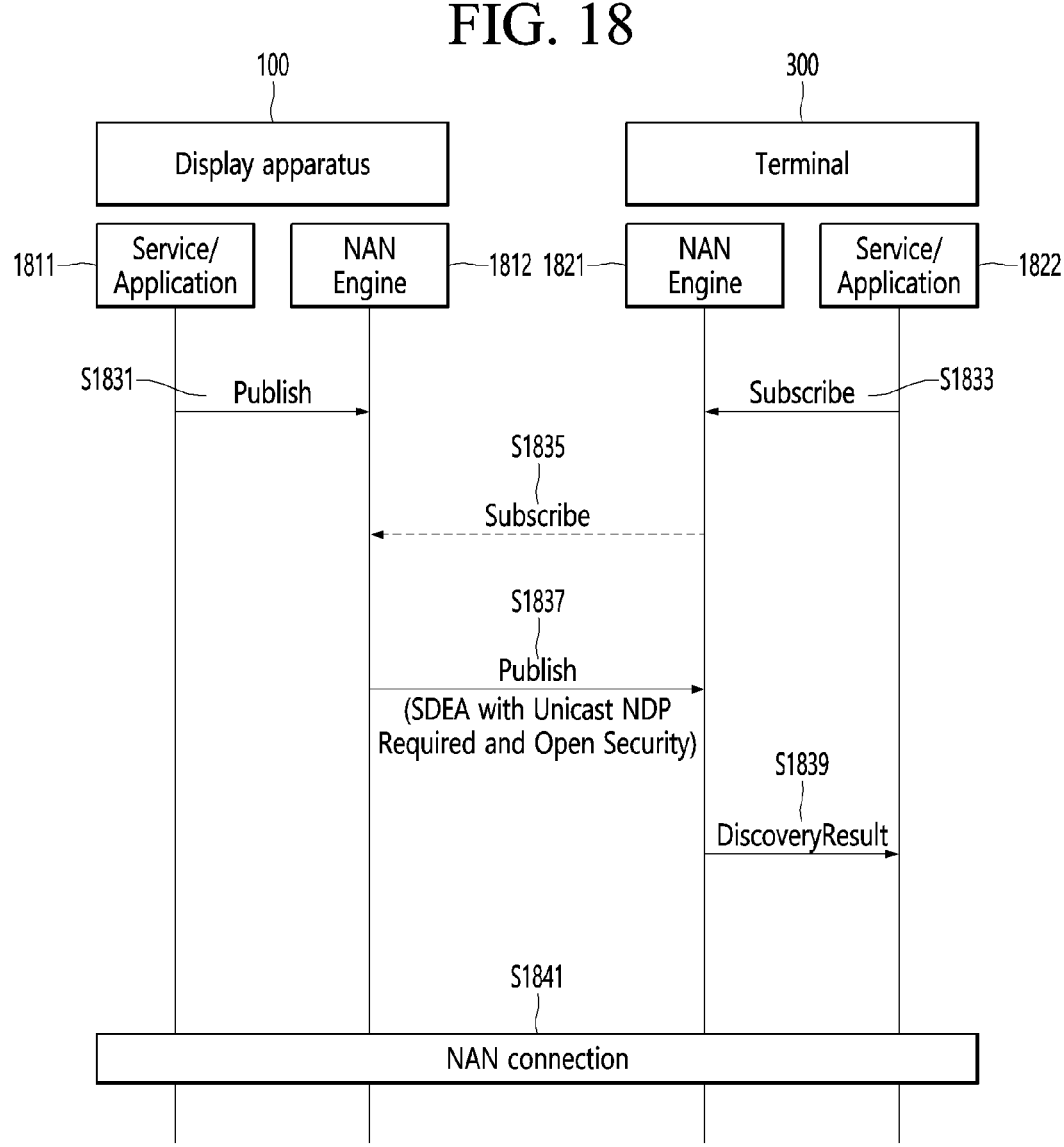
FIG. 18 is a ladder diagram illustrating a method for establishing a NAN connection between a terminal and a display apparatus according to an embodiment of the present disclosure.

FIG. 18 is a ladder diagram illustrating a method for establishing a NAN connection between a display apparatus and a terminal according to an embodiment of the present disclosure.

Referring to FIG. 18, the display apparatus 100 and the terminal 300 are NAN terminals, and the display apparatus 100 includes a service/application 1811 and a NAN engine 1812, and the terminal 300 may include a NAN engine 1821 and service/application 1822.

The service/application 1811 of the display apparatus 100 requests publication of the NAN service to the NAN engine 1812 to provide the service using the NAN (S1831). Accordingly, the NAN engine 1812 of the display apparatus 100 may provide NAN connection information to other NAN terminals by publishing a NAN service for NAN connection.

The service/application 1822 of the terminal 300 requests subscription of the NAN service to the NAN engine 1821 to use the service using the NAN (S1833). Then, the NAN engine 1821 of the terminal 300 subscribes to the NAN service published by the NAN engine 1812 of the display apparatus 100 (S1835).

The NAN engine 1812 of the display apparatus 100 publishes information about the NAN service in response to the NAN service subscription of the NAN engine 1821 of the terminal 300 (S1837). Here, the published information may include Service Descriptor Extension Attribute (SDEA) including a required Unicast NAN Data Path and Open Security.

The NAN engine 1821 of the terminal 300 delivers a Discovery Result based on information on the acquired NAN service to the service/application 1822 (S1839).

Accordingly, a NAN connection between the display apparatus 100 and the terminal 300 may be established (S1841).

In particular, the display apparatus 100 and the terminal 300 may establish a NAN connection by directly communicating with each other, but may establish a NAN connection by communicating through an access point (AP) in the middle thereof.

Figure 19:
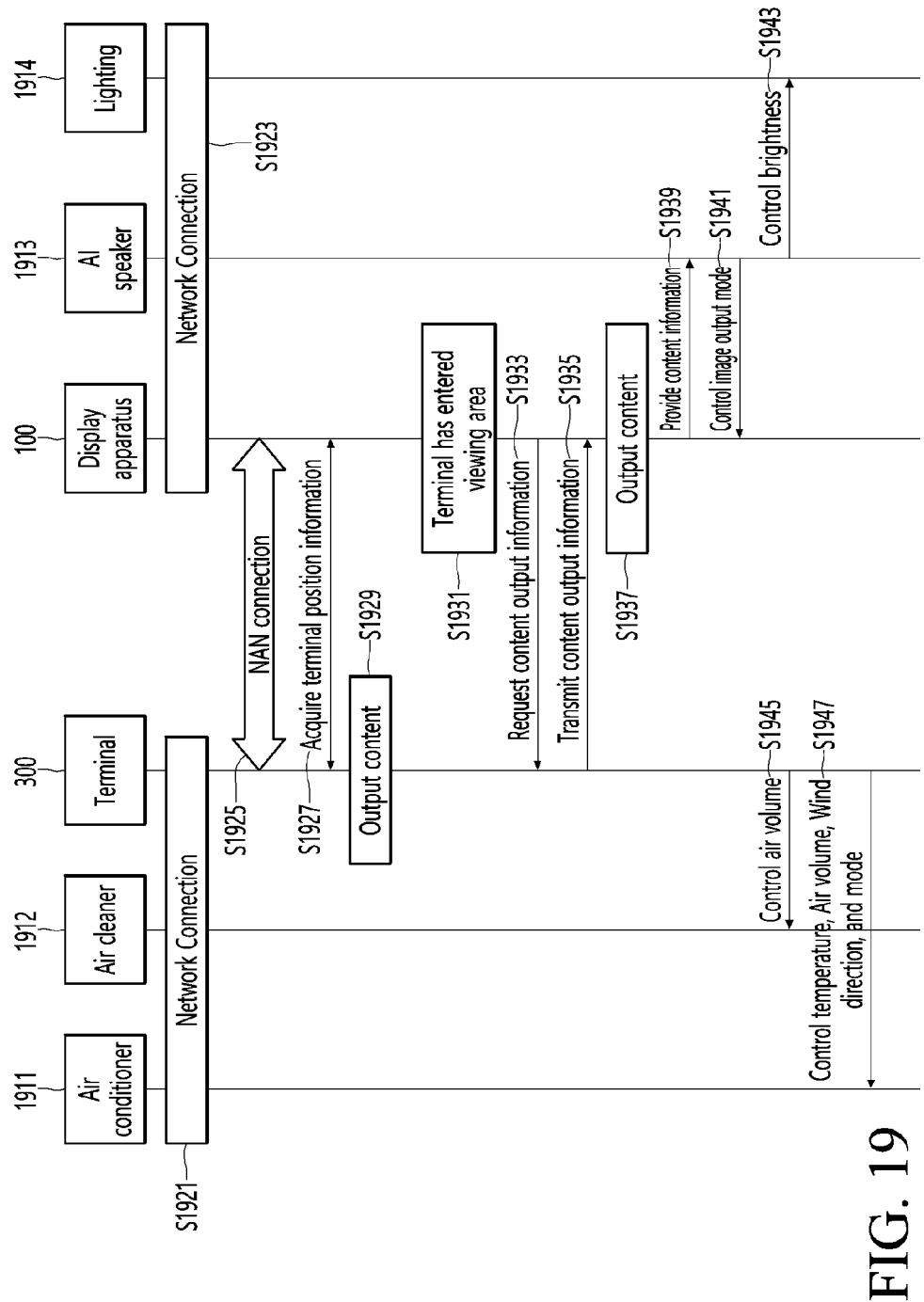
FIG. 19 is a ladder diagram illustrating a method for providing content in connection with a user terminal according to an embodiment of the present disclosure.

FIG. 19 is a ladder diagram illustrating a method for providing content in connection with a user terminal according to an embodiment of the present disclosure.

Specifically, FIG. 19 illustrates an embodiment in a situation in which a terminal 300 outputting content approaches the display apparatus 100 and enters the viewing area of the display apparatus 100.

Referring to FIG. 19, the terminal 300 establishes a network connection with devices 1911 and 1912 having a communication function (S1921). For example, devices connected to the terminal 300 may be an air conditioner 1911 and an air cleaner 1912. The network between the terminal 300, the air conditioner 1911, and the air purifier 1912 may be connected by directly communicating with each other or may be connected by communicating through an access point (AP) in the middle thereof. In addition, the network connection between the terminal 300, the air conditioner 1911, and the air cleaner 1912 may include various network connections such as a wired network, a WAN, and a NAN.

The display apparatus 100 establishes a network connection with devices 1913 and 1914 having communication functions (S1923). For example, devices connected to the display apparatus 100 may be an artificial intelligence speaker 1913 and lighting 1914. The network between the display apparatus 100, the artificial intelligence speaker 1913, and the lighting 1914 may be connected by directly communicating with each other, or may be connected by communicating through an access point (AP) in the middle thereof. In addition, the network connection between the display apparatus 100, the artificial intelligence speaker 1913, and the lighting 1914 may include various network connections such as a wired network, WAN, NAN, and the like.

Then, a NAN connection is established between the display apparatus 100 and the terminal 300 (S1925), and the display apparatus 100 and the terminal 300 acquire position information for the terminal 300 (S1927). The process in which the display apparatus 100 acquires position information for the terminal 300 may include a process in which the display apparatus directly receives position information from the terminal 300 as well as a process in which the display apparatus 100 directly generates the position information of the terminal 300 based on a communication signal transmitted and received with the terminal 300. In this process, the terminal 300 may also acquire the position information of the terminal by receiving the position information of the terminal. The position information for the terminal 300 may be updated periodically or in real-time while the NAN connection with the display apparatus 100 is maintained.

Then, the terminal 300 outputs the output target content (S1929).

Although FIG. 19 illustrates that the terminal 300 outputs content after the display apparatus 100 and the terminal 300 are connected, the present disclosure is not limited thereto. In other words, the order of performing the step S1925 in which the display apparatus 100 and the terminal 300 establish a NAN connection and the step S1929 in which the terminal 300 outputs content may be changed, or the steps may be performed in parallel.

Then, the display apparatus 100 determines that the terminal 300 has entered the viewing area of the display apparatus 100 (S1931), requests content output information from the terminal 300 (S1933), receives content output information from the terminal 300 (S1935), and outputs content based on the received content output information (S1937).

In addition, the display apparatus 100 provides content information corresponding to the output target content to the artificial intelligence speaker 1913 functioning as a hub among the connected external devices (S1939), and the artificial intelligence speaker 1913 controls an image output mode of the display apparatus 100 based on the provided content information (S1941) and controls the brightness or power of the lighting 1914 (S1943). For example, if the content to be output is a movie, the artificial intelligence speaker 1913 may change the image output mode of the display apparatus 100 to a "movie mode" and "deactivate" the operation of the lighting 1914.

In addition, the terminal 300 may grasp that the terminal 300 has entered the viewing area of the display apparatus 100 upon receiving a request of content output information from the display apparatus 100, and accordingly, the terminal 300 controls the air volume of the air purifier 1912 for the viewing area of the display apparatus 100 (S1945) and controls the temperature, air volume, wind direction or operation mode of the air conditioner 1911 for the viewing area of the display apparatus 100 (S1947). For example, if the air volume of the air purifier 1912 preferred by the user of the terminal 300 is 'weak wind', the preferred temperature is '25 degrees Celsius', and the user prefers to directly expose to the wind, the terminal 300 may adjust the air volume of the air purifier 1912 to 'weak wind', adjust the mode of the air conditioner 1911 to 'cooling mode', set the target temperature to '25 degrees Celsius', and set the wind direction to the position of the terminal 300.

Furthermore, the display apparatus 100 may deliver a notification generated by the artificial intelligence speaker 1913 or the lighting 1914 which is a connected external device to the terminal 300. In addition, if the terminal 300 enters the viewing area of the display apparatus 100, the terminal 300 may scan a peripheral external device to try to connect to the peripheral external device, control the connected external device, or receive a notification from the connected external device.

In particular, the terminal 300 and the display apparatus 100 may process the operation of outputting the output target content being output from the terminal 300 on the display apparatus 100 with the highest priority, and thereafter process control operations (for example, lighting control, screen mode control, or the like) which are related to outputting of the content, and finally, process control operations (for example, cooling control, notification provision, or the like) which are not related to outputting of content.

Figure 20:
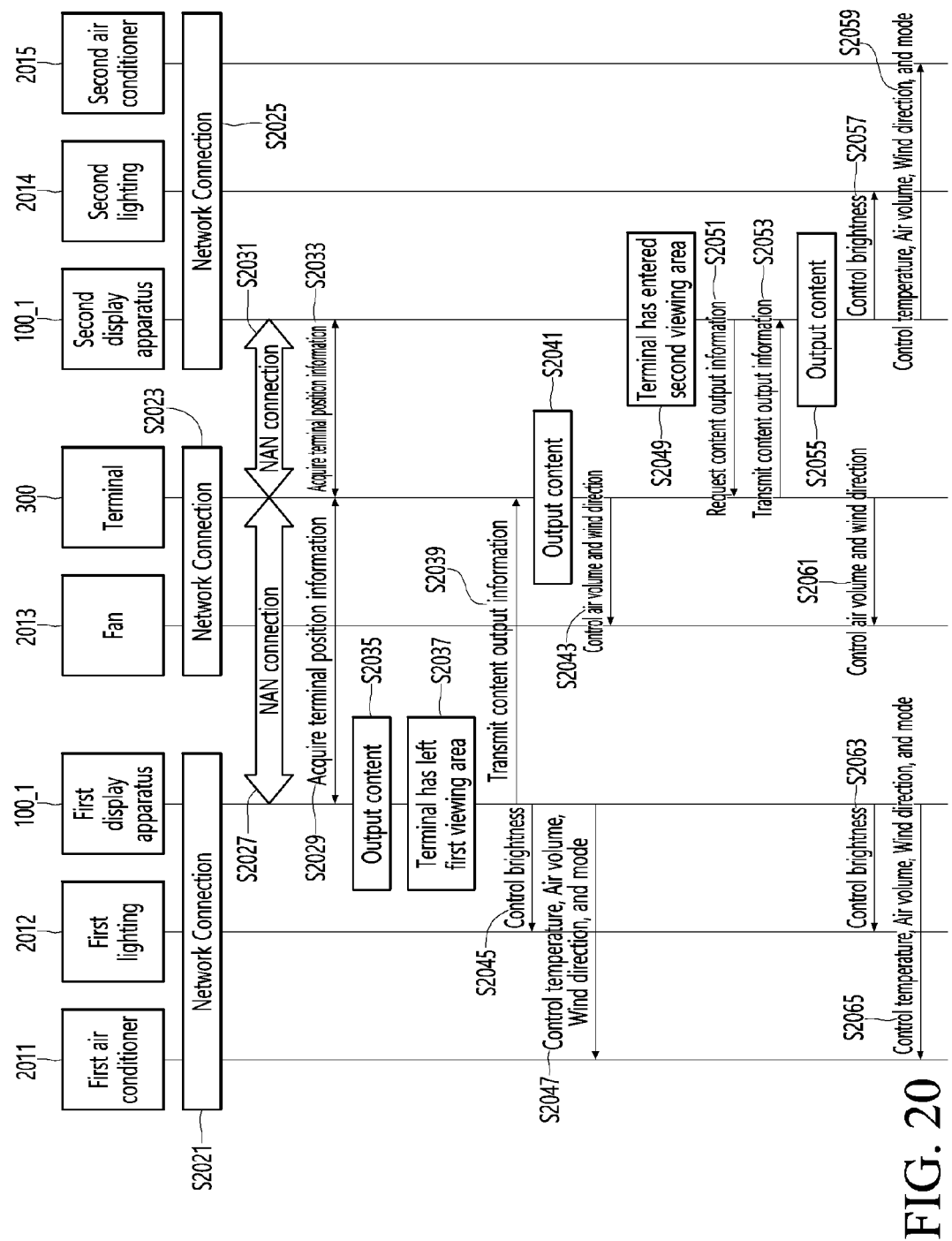
FIG. 20 is a ladder diagram illustrating a method for providing content in connection with a user terminal according to an embodiment of the present disclosure.

FIG. 20 is a ladder diagram illustrating a method for providing content in connection with a user terminal according to an embodiment of the present disclosure.

Specifically, FIG. 20 illustrates an embodiment in a situation in which the terminal 300 is positioned in the first viewing area of the first display apparatus 100_1 in which the content is being output, and then the terminal 300 approaches the second display apparatus 100_2 to enter the second viewing area of the second display apparatus 100_2.

Referring to FIG. 20, the first display apparatus 100_1 establishes a network connection with devices 2011, 2012 having a communication function (S2021), the terminal 300 establishes a network connection with a device 2013 having a communication function (S2023), and the second display apparatus 100_2 establishes a network connection with devices 2014, 2015 having a communication function (S2025). For example, the first display apparatus 100_1 may be connected to the first air conditioner 2011 and the first light 2012 (which are installed in the same space), the terminal 300 may be connected to the fan 2013, and the second display apparatus 100_2 may be connected to the second lighting 2014 and the second air conditioner 2015 (which are installed in the same space). In addition, the first display apparatus 100_1, the terminal 300, or the second display apparatus 100_2 may be directly connected to devices (2011 to 2015) having a communication function or may be connected by communicating through an AP in the middle thereof.

In one embodiment, the step S2021 of establishing a network connection to the first display apparatus 100_1, the step S2023 of establishing a network connection to the terminal 300, and the step S2025 of establishing a network connection to the second display apparatus 100_2 may be performed in parallel with each other or may be performed in any order.

Then, a NAN connection is established between the first display apparatus 100_1 and the terminal 300 (S2027), and the first display apparatus 100_1 and the terminal 300 acquire position information for the terminal 300 (S2029). In addition, a NAN connection is established between the second display apparatus 100_2 and the terminal 300 (S2031), and the second display apparatus 100_1 and the terminal 300 acquire position information for the terminal 300 (S2033). The position information for the terminal 300 may be updated periodically or in real-time while the NAN connection with the first display apparatus 100_1 or the second display apparatus 100_1 is maintained.

If a NAN connection is established between the first display apparatus 100_1 and the terminal 300 and a NAN connection is established between the second display apparatus 100_2 and the terminal 300, the first display apparatus 100_1 and the second display apparatus 100_2 may belong to the same NAN network together with the terminal 300 to directly communicate with each other, or to communicate with each other through the terminal 300.

In one embodiment, the step S2027 of establishing a NAN connection between the first display apparatus 100_1 and the terminal 300 and the step S2031 of establishing a NAN connection between the second display apparatus 100_2 and the terminal 300 may be performed in parallel with each other or may be performed in any order. In addition, unlike that illustrated in FIG. 20, the step S2031 of establishing a NAN connection between the second display apparatus 100_2 and the terminal 300 may perform after the terminal 300 has left the first viewing area of the first display apparatus 100_1.

Then, the first display apparatus 100_1 outputs the output target content (S2035).

Although FIG. 19 illustrates that the first display apparatus 100_1 outputs content after the first display apparatus 100_1 and the terminal 300 are connected, the present disclosure is not limited thereto. In other words, the order of performing a step S2027 in which the first display apparatus 100_1 and the terminal 300 establish a NAN connection and a step S2035 in which the first display apparatus 100_1 outputs the content may be changed, or the steps may be performed in parallel with each other.

Then, the first display apparatus 100_1 determines that the terminal 300 has left the first viewing area of the first display apparatus 100_1 (S2037), transmits content output information to the terminal 300 (S2039), and the terminal 300 outputs the content based on the received content output information (S2041).

Then, the terminal 300 controls the air volume or the wind direction of the fan 2013 based on the position information of the terminal 300 (S2043). For example, the terminal 300 may set the wind direction of the fan 2013 to the direction of the terminal 300, and set the air volume higher as the terminal 300 moves away from the fan 2013. In addition, the first display apparatus 100_1 controls the brightness or power of the first lighting 2012 based on the position information of the terminal 300 as the terminal 300 has left the first viewing area (S2045) and controls the temperature, the air volume, the wind direction, or the operation mode of the first air conditioner 2011 (S2047). For example, since the user or the terminal 300 has left the first viewing area, the first display apparatus 100_1 may set the brightness of the first lighting 2012 to be dark, increase the set temperature of the first air conditioner 2011, or lower the air volume. In addition, although not illustrated in FIG. 20, the first display apparatus 100_1 may control operations of the second lighting 2014 and the second air conditioner 2015 through the second display apparatus 100_2.

Although the steps S2039, S2041 of outputting the content on the terminal 300 and the steps S2043 to S2047 of controlling other devices may be performed in parallel, as the terminal 300 has left the first viewing area, basically, the steps S2039, S2041 of outputting content on the terminal 300 may be preferentially processed. In addition, the steps S2043 to S2047 of controlling other devices may be performed in parallel with each other or may be performed in any order.

Then, the second display apparatus 100_2 determines that the terminal 300 has entered the second viewing area of the second display apparatus 100_2 (S2049), requests content output information to the terminal 300 (S2051), receives content output information from the terminal 300 (S2053), and outputs content based on the received content output information (S2055).

Then, as the terminal 300 enters the second viewing area, the second display apparatus 100_2 controls the brightness or power of the second lighting 2014 based on the position information of the terminal 300 (S2047) and controls the temperature, the air volume, the wind direction, or the operation mode of the second air conditioner 2015 (S2059). For example, the second display apparatus 100_2 may supply power to the second lighting 2014 and the second air conditioner 2015, and operate them with the user's preference. In addition, the terminal 300 controls the air volume or the wind direction of the fan 2013 based on the position information of the terminal 300 (S2061). In addition, the first display apparatus 100_1 controls the brightness or power of the first lighting 2012 based on the position information of the terminal 300 (S2063) and controls the temperature, the air volume, the wind direction, or the operation mode of the first air conditioner 2011 (S2065). For example, since the user or the terminal 300 has entered the second viewing area, the first display apparatus 100_1 may cut off the power of the first lighting 2012 and the first air conditioner 2011.

The steps S2063, S2065 of controlling the first air conditioner 2011 and the first lighting 2012 connected to the first display apparatus 100_1 may be performed through the first display apparatus 100_1 by the terminal 300 or the second display apparatus 100_2, or may be performed by the first display apparatus 100_1 by directly determining position change of the terminal 300.

Although the steps S2051 to S2055 of outputting content from the terminal 300 and the steps S2057 to S2065 of controlling other devices may be performed in parallel, as the terminal 300 enters the second viewing area, basically, the steps S2051 to S2055 of outputting content from the second display apparatus 100_2 may be preferentially processed. In addition, the steps S2057 to S2065 of controlling other devices may be performed in parallel with each other or may be performed in any order.

Figure 21:
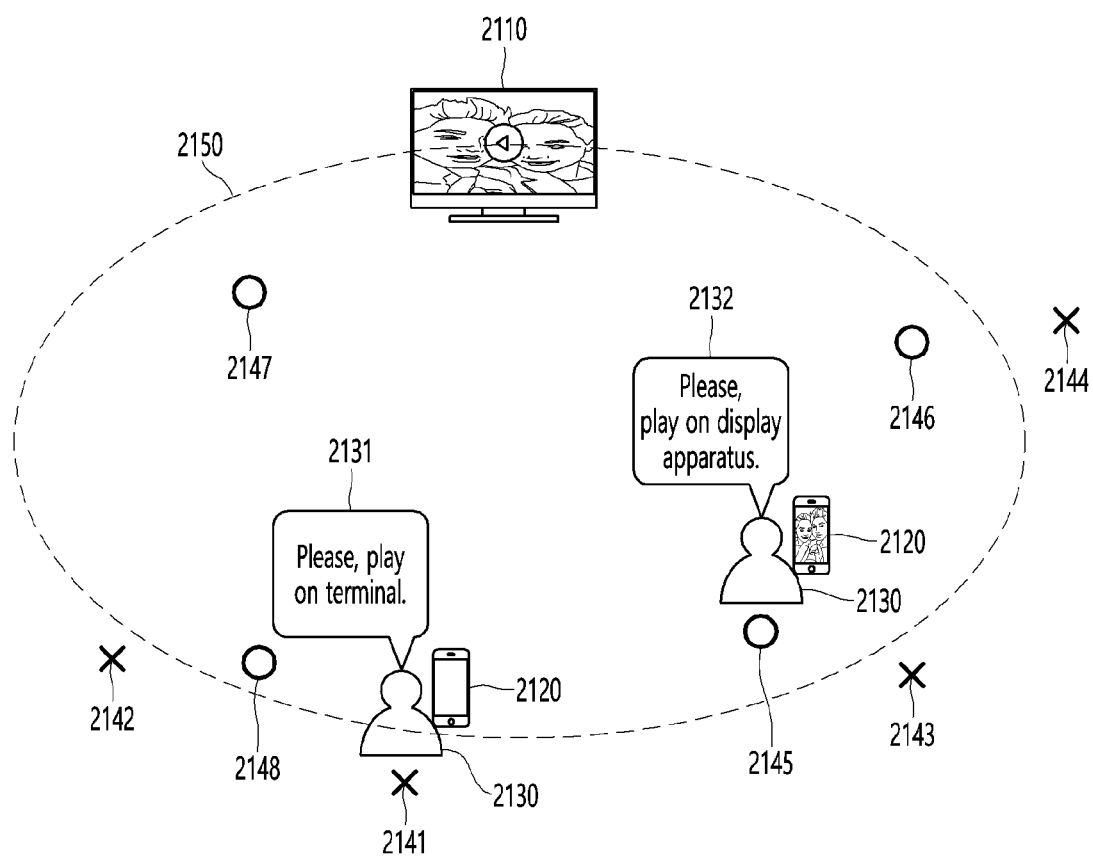
FIG. 21 is a view illustrating an embodiment of determining a user setting viewing area based on viewing area deviation feedback.

FIG. 21 is a view illustrating an embodiment of determining a user setting viewing area based on viewing area deviation feedback.

Referring to FIG. 21, the display apparatus 2110 may receive viewing area deviation feedback from the user 2130 or the terminal 2120 and determine a user setting viewing area 2150 based on the received viewing area deviation feedback.

Specifically, if the user 2130 requests to output the content being output from the display apparatus 2110 on the terminal 2120 by uttering 2131 "please, play on the terminal." at the first position 2141, this request may be considered as feedback indicating that the user 2130 or the terminal 2120 has left the viewing area.

The feedback indicating that the user has left the viewing area may include, as illustrated in FIG. 21, the voice utterance of the user 2130 as well as the control to output the content being output from the display apparatus 2110 on the terminal 2120 instead. In other words, if the user 2130 controls the terminal 2120 to output the content being output from the display apparatus 2110 through the terminal 2120, this behavior may be considered as feedback indicating that the user 2130 or the terminal 2120 has left the viewing area.

In FIG. 21, the feedbacks acquired at the first position 2141, the second position 2142, the third position 2143, and the fourth position 2144 are feedbacks indicating that the user 2130 or the terminal 2120 has left the viewing area.

Whereas, if the user requests to output the content being output from the terminal 2120 on the display apparatus 2110 by uttering 2132 "please, play on the display apparatus." at the fifth position 2145, this request may be considered as feedback indicating that the user 2130 or the terminal 2120 has not left the viewing area (or feedback indicating that the user 2130 or terminal 2120 has entered the viewing area or is within the viewing area).

The feedback indicating that the user or the terminal has not left the viewing area, as illustrated in FIG. 21, includes the voice utterance of the user 2130 as well as the control to output the content being output from the terminal 2120 on the display apparatus 2110 instead. In other words, if the user 2130 controls the terminal 2120 to output the content being output from the terminal 2120 through the display apparatus 2110, this behavior may be considered as feedback indicating that the user 2130 or the terminal 2120 has not left the viewing area.

In FIG. 21, the feedbacks acquired at the fifth position 2145, the sixth position 2146, the seventh position 2147, and the eighth position 2148 are feedbacks indicating that the user 2130 or the terminal 2120 has not left the viewing area.

Then, the display apparatus 2110 may determine the user setting viewing area 2150 based on the feedbacks acquired at the respective position 2141 to 2148. The determined user setting viewing area 2150 does not include the first position to the fourth position 2141 to 2144 and may include the fifth position to the eighth position 2145 to 2148.

There is an advantage that as the more viewing area deviation feedback is collected from the user 2130 or the terminal 2120, it is possible to set the user setting viewing area more precisely. However, since the viewing area considered by the user 2130 may vary over time, the weight or importance of the collected viewing area deviation feedback may be calculated to be low as the collected time thereof is farther away.

FIG. 21 only illustrates an embodiment of determining a user setting viewing area based on only the positional relationship between the display apparatus 2110 and the terminal 2120 and viewing area deviation feedback without separate map data, and the display apparatus 2110 may also determine the user setting viewing area by additionally using map data for the installed space.

Figure 22:
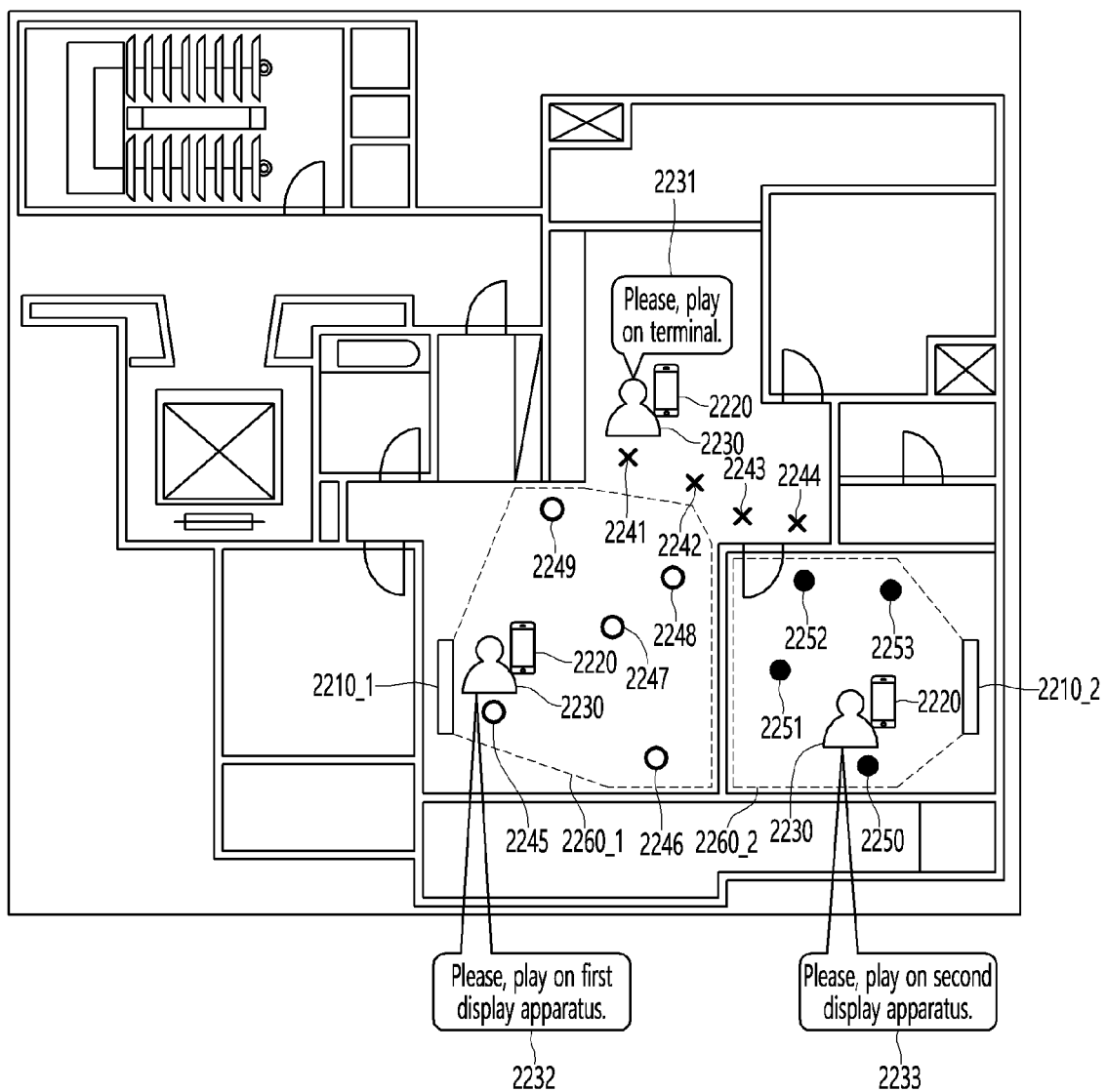
FIG. 22 is a view illustrating an embodiment of determining a user setting viewing area based on viewing area deviation feedback.

FIG. 22 is a view illustrating an embodiment of determining a user setting viewing area based on viewing area deviation feedback.

Referring to FIG. 22, the first display apparatus 2210_1 or the second display apparatus 2210_2 may receive viewing area deviation feedback from the user 2030 or the terminal 2220, and determine the first user setting viewing area 2260_1 corresponding to the first display apparatus 2210_1 and the second user setting viewing area 2260_2 corresponding to the second display apparatus 2210_2 based on the map data and the received viewing area deviation feedback.

Specifically, if the user 2230 requests to output the content being output from the first display apparatus 2210_1 or the second display apparatus 2210_2 on the terminal 2220 by uttering 2231 "please, play on the terminal." at the first position 2241, this request may be considered as feedback indicating that the user 2230 or the terminal 2220 has left the first viewing area of the first display apparatus 2210_1 and the second viewing area of the second display apparatus 2210_2.

The feedback indicating that the user or the terminal has left the viewing area, as illustrated in FIG. 22, includes voice utterance of the user 2230 as well as the control to output the content being output from the first display apparatus 2210_1 or the second display apparatus 2210_2 on the terminal 2220 instead.

In FIG. 22, the feedbacks acquired at the first position 2221, the second position 2242, the third position 2243, and the fourth position 2244 are feedbacks indicating that the user 2230 or the terminal 2220 has left the first viewing area of the first display apparatus 2210_1 and the second viewing area of the second display apparatus 2210_2.

Whereas, if the user requests to output the content being output from the terminal 2220 on the first display apparatus 2210_1 by uttering 2232 "please, play on the first display apparatus." at the fifth position 2245, this request may be considered as feedback indicating that the user 2230 or the terminal 2220 has not left the first viewing area of the first display apparatus 2210_1 (or feedback indicating that the user or the terminal has entered the first viewing area or is within the first viewing area). Furthermore, feedback indicating that the terminal 2220 has not left the first viewing area of the first display apparatus 2210_1 may be considered as feedback indicating that the terminal 2220 has left the second viewing area of the second display apparatus 2210_2.

In FIG. 22, the feedbacks acquired at the fifth position 2245, the sixth position 2246, the seventh position 2247, the eighth position 2248, and the ninth position 2248 are feedbacks indicating that the user 2230 or the terminal 2220 has not left the first viewing area of the first display apparatus 2210_1.

In addition, whereas, if user requests to output the content being output from the terminal 2220 on the second display apparatus 2210_2 by uttering 2223 "please, play on the second display apparatus." at the tenth position 2250, this request may be considered as feedback indicating that the user 2230 or the terminal 2220 has not left the second viewing area of the second display apparatus 2210_2 (or feedback indicating that the user or the terminal has entered the second viewing area or is within the second viewing area). Furthermore, feedback indicating that the terminal 2220 has not left the second viewing area of the second display apparatus 2210_2 may be considered as feedback indicating that the terminal 2220 has left the first viewing area of the first display apparatus 2210_1.

In FIG. 22, the feedbacks acquired at the tenth position 2250, the eleventh position 2251, the twelfth position 2252, and the thirteenth position 2253 are feedbacks indicating that the user 2230 or the terminal 2220 has not left the second viewing area of the second display apparatus 2210_2.

Then, the first display apparatus 2210_1 or the second display apparatus 2210_2 may determine a first user viewing setting area 2260_1 corresponding to the first display apparatus 2210_1 and a second user viewing setting area 2260_2 corresponding to the second display apparatus 2210_2 based on the feedback acquired at the respective positions 2241 to 2253. The determined first user setting viewing area 2260_1 does not include the first position to the fourth position 2241 to 2244 and the tenth position to the thirteenth position 2250 to 2253, and may include the fifth position to the ninth position 2245 to 2249. In addition, the determined second user setting viewing area 2260_2 does not include the first position to the ninth position 2241 to 2249, and may include the tenth position to the thirteenth position 2250 to 2253.

Map data that may be used to determine a user setting viewing area may include design plot data, Simultaneous Localization And Mapping (SLAM) map data, and the like.

Figure 23:
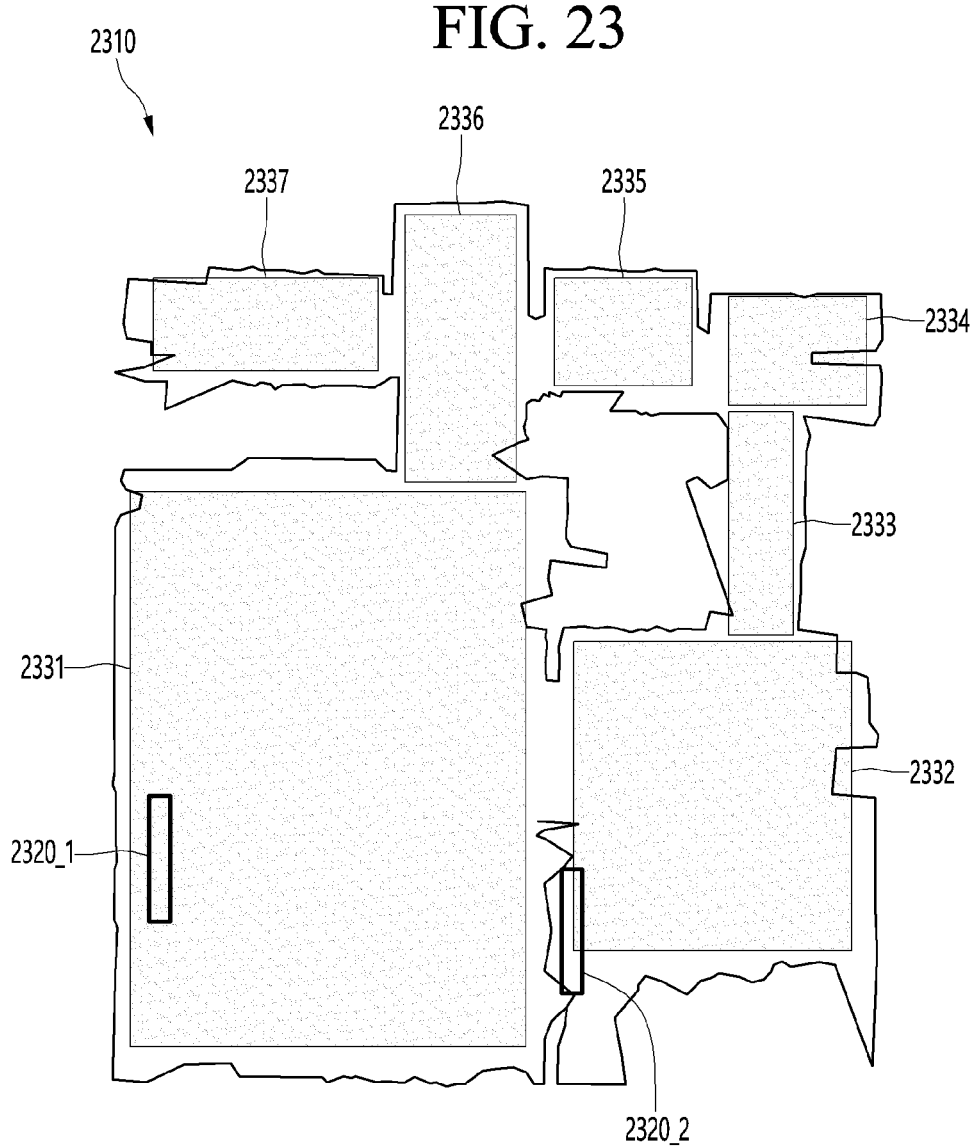
FIG. 23 is a diagram illustrating an embodiment of illustrating a method for determining whether to have left a viewing area using map data.

FIG. 23 is a diagram illustrating an embodiment of a method for determining whether to have left a viewing area using map data.

Referring to FIG. 23, the first display apparatus 2320_1 or the second display apparatus 2320_2 receives map data 2310 in a space in which each display apparatus 2320_1 and 2320_2 are installed. The map data 2310 may be SLAM map data, and the map data 2310 may be generated by a movable external device (for example, a robot cleaner) equipped with at least one sensor.

The first display apparatus 2320_1 or the second display apparatus 2320_2 may divide the indoor space into a plurality of zones based on the acquired map data 2310. For example, in the map data 2310 illustrated in FIG. 23, the indoor space may be divided into seven zones 2331 to 2337. The number, the size, or the shape of the zones in which the indoor space is divided may vary according to the structure or the shape of the space, and the present disclosure is not limited thereto.

In addition, since the first display apparatus 2320_1 is included in the first zone 2331 among the divided zones 2331 to 2337, the first display apparatus 2320_1 or the second display apparatus 2320_2 may treat the first zone 2331 to be the same as or similar to the first viewing area of the first display apparatus 2320_1. For example, if it is determined that the user's terminal has left the first zone 2331, the first display apparatus 2320_1 or the second display apparatus 2320_2 may determine that the user has left the first viewing area of the first display apparatus 2320_1.

Similarly, since the second display apparatus 2320_2 is included in in the second zone 2332 among the divided zones 2331 to 2337, the first display apparatus 2320_1 or the second display apparatus 2320_2 may treat the second zone 2332 to be the same as or similar to the second viewing area of the second display apparatus 2320_2. For example, if it is determined that the user's terminal has left the second zone 2332, the first display apparatus 2320_1 or the second display apparatus 2320_2 may determine that the user has left the second viewing area of the second display apparatus 2320_2.

Furthermore, as illustrated in FIG. 22, the viewing zone of the respective display apparatus 2320_1 and 2320_2 may be determined by additionally considering the viewing area deviation feedback of the user.

According to an embodiment of the present disclosure, the above-described method may be implemented as a processor-readable code in a medium where a program is recorded. Examples of a processor-readable medium may include hard disk drive (HDD), solid state drive (SSD), silicon disk drive (SDD), read-only memory (ROM), random access memory (RAM), CD-ROM, a magnetic tape, a floppy disk, and an optical data storage device.

Other implementations are within the scope of the following claims.

What is claimed is:

1. A display apparatus comprising:
a display;
an audio output interface;
a memory;
a communication interface configured to connect to a terminal of a user; and
a processor configured to:
output, via at least one of the display or the audio output interface, content stored in the memory or received through the communication interface;
determine a position of the terminal to which the communication interface is connected;
determine whether the position of the terminal is outside of a viewing area; and
based on determining that the position of the terminal is outside of the viewing area:
output the content to the terminal;
determine whether there is another user in addition to the user who corresponds to the terminal;
based on determining that there is another user, continue outputting the content via the at least one of the display or the audio output interface, concurrent with outputting the content to the terminal; and
based on determining that there is not another user, mute sound output through the audio output interface, concurrent with outputting the content to the terminal.

2. The display apparatus of claim 1,
wherein the processor is further configured to:
based on determining that the position of the terminal is outside of the viewing area, transmit a signal through the communication interface, the signal querying whether to continuously play the content at the terminal; and
based on receiving a response from the terminal consenting to continuous play of the content, output the content to the terminal.

3. The display apparatus of claim 1,
wherein the processor is further configured to:
output the content to the terminal by transmitting data corresponding to the content to the terminal through the communication interface.

4. The display apparatus of claim 1,
wherein the processor is further configured to:
output the content to the terminal by transmitting connection information corresponding to the content to the terminal through the communication interface.

5. The display apparatus of claim 1,
wherein the processor is further configured to:
based on the communication interface being connected to another terminal, determine that there is another user.

6. The display apparatus of claim 1, further comprising:
a camera,
wherein the processor is further configured to:
determine whether there is another user other than the user who corresponds to the terminal, based on an image acquired from the camera.

7. The display apparatus of claim 1,
wherein the processor is further configured to:
determine whether the position of the terminal is inside of the viewing area; and
based on determining that the position of the terminal is inside of the viewing area, output the content being output to the terminal through at least one of the display or the audio output interface.

8. The display apparatus of claim 1,
wherein the processor is further configured to:
determine the position of the terminal based on at least one of received signal strength indication (RSSI) or round trip time (RTT) of a communication signal received from the terminal.

9. The display apparatus of claim 1,
wherein the processor is further configured to:
based on the communication interface being connected to a plurality of devices, determine the position of the terminal using the plurality of devices.

10. The display apparatus of claim 1,
wherein the processor is further configured to:
determine whether the position of the terminal is outside of the viewing area in consideration of at least one of a distance between the terminal and the display apparatus, a positional relationship between the terminal and another device, a user setting viewing area, or map data.

11. The display apparatus of claim 10,
wherein the processor is further configured to:
based on determining that the position of the terminal is outside of the user setting viewing area, determine that the position of the terminal is outside of the viewing area, and
wherein the user setting viewing area is a viewing area corresponding to the display apparatus that is set by the user or another user.

12. The display apparatus of claim 11,
wherein the processor is further configured to:
set the user setting viewing area based on viewing area deviation feedback for the terminal and a position of the terminal, and
wherein the viewing area deviation feedback is feedback indicating whether the position of the terminal is outside of the viewing area or not.

13. The display apparatus of claim 10,
wherein the processor is further configured to:
divide a space included in the map data into one or more zones; and
based on the terminal being positioned in a zone different from a zone in which the display apparatus is positioned, determine that the position of the terminal is outside of the viewing area, and
wherein the map data is map data for a space in which the display apparatus is installed.

14. A method for operating a display apparatus comprising a display, an audio output interface, a memory and a communication interface, the method comprising:
connecting to a terminal of a user through the communication interface;
outputting, via at least one of the display or the audio output interface, content stored in the memory or received through the communication interface;
determining a position of the terminal to which the display apparatus is connected through the communication interface;
determining whether the position of the terminal is outside of a viewing area; and
based on determining that the position of the terminal is outside of the viewing area:
outputting the content to the terminal;

determining whether there is another user in addition to the user who corresponds to the terminal;

based on determining that there is another user, continuing to output the content via the at least one of the display or the audio output interface, concurrent with outputting the content to the terminal; and based on determining that there is not another user, muting sound output through the audio output interface, concurrent with outputting the content to the terminal.

15. A non-transitory recording medium having recorded thereon a computer program for controlling a processor to perform a method for operating a display apparatus comprising a display, an audio output interface, a memory and a communication interface, the method comprising:

connecting to a terminal of a user through the communication interface;

outputting, via at least one of the display or the audio output interface, content stored in the memory or received through the communication interface;

determining a position of the terminal to which the display apparatus is connected through the communication interface;

determining whether the position of the terminal is outside of a viewing area; and based on determining that the position of the terminal is outside of the viewing area:

outputting the content to the terminal;

determining whether there is another user in addition to the user who corresponds to the terminal;

based on determining that there is another user, continuing to output the content via the at least one of the display or the audio output interface, concurrent with outputting the content to the terminal; and based on determining that there is not another user, muting sound output through the audio output interface, concurrent with outputting the content to the terminal.

* * * * *